US007599871B1

(12) United States Patent
Borland

(10) Patent No.: US 7,599,871 B1
(45) Date of Patent: Oct. 6, 2009

(54) METHOD AND SYSTEM FOR NON-GAUSSIAN PRICING OF OPTIONS AND OTHER DERIVATIVES

(75) Inventor: Lisa Marina Borland, San Francisco, CA (US)

(73) Assignee: Evnine & Associates, Inc., San Francisco, CA (US)

( * ) Notice: Subject to any disclaimer, the term of this patent is extended or adjusted under 35 U.S.C. 154(b) by 1428 days.

(21) Appl. No.: 10/336,363

(22) Filed: Jan. 3, 2003

(51) Int. Cl.
*G06Q 40/00* (2006.01)

(52) U.S. Cl. .................................... 705/36 R
(58) Field of Classification Search ............... 705/36
See application file for complete search history.

(56) References Cited

OTHER PUBLICATIONS

Borland, L: A Non-Gaussian model of stock returns: optionsmiles, credit skews, and a multi-time scale memory, Keynote Address, 2005, Noise and Fluctuation in Econophysics and Finance, pp. 55-65.*
Borland, L: Nonextensive statistical mechanics and economics, 2003, Physica A 324, pp. 89-100.*
Borland, L: Option pricing formulas based on a non-gaussian stock price model, Aug. 26, 2002, Physical Review Letters, vol. 89, No. 9, pp. 098701-4.*
*Nonextensive Entropy-Interdisciplinary Applications*, edited by M. Gell-Mann and C. Tsallis, Oxford University Press, Jul. 2004 (title page, table of contents, and a reprint of pp. 305-320 (odd-numbered pages only).
Lisa Borland and J. P. Bouchaud, "A non-Gaussian option pricing model with skew," Quantitative Finance, vol. 4 (Oct. 2004), pp. 499-514.
Borland, Lisa, "Long-range memory and nonextensivity in financial markets," Europhysics News, vol. 36, No. 6 (Nov.-Dec. 2005), pp. 228-231.
Lisa Borland, Jeremy Evnine, and Benoit Pochart, A Merton-Like Approach to Pricing Debt based on a non-Gaussian Asset Model, posted on the Internet on Jan. 17, 2005, at http://xxx.lanl.gov/abs/cond-mat/0501395v1, pp. 1-12.
Lisa Borland, "Non-Gaussian option pricing: Successes, limitations and perspectives," in *Anomalous Fluctuation Phenomena in Complex Systems: Plasmas, Fluids, and Financial Markets*, edited by Claudia Riccardi and H. Eduardo Roman, 2008, ISBN: 978-81-308-0255-8, pp. 311-333.
Lisa Borland, "Erratum: A theory of non-Gaussian option pricing," Quantitative Finance, vol. 7, No. 6, p. 701 (2007).
Lisa Borland and J. P. Bouchaud, "Erratum: A non-Gaussian option pricing model with skew," Quantitative Finance, vol. 7, No. 6, p. 703 (2007).
Borland, Lisa, "Option Pricing Formulas Based on a Non-Gaussian Stock Price Model," (published on Aug. 7, 2002) *Physical Review Letters*, vol. 89, No. 9, Aug. 26, 2002, pp. 098701-1-098701-4.

(Continued)

*Primary Examiner*—Hani Kazimi
*Assistant Examiner*—Bijendra K Shrestha
(74) *Attorney, Agent, or Firm*—Girard & Equitz LLP

(57) ABSTRACT

In preferred embodiments, a method and system for pricing a derivative (e.g., a stock option) based on a non-Gaussian price model assuming statistical feedback. The dynamics of the underlying financial instrument (e.g., stock) are assumed to follow a stochastic process with anomalous nonlinear diffusion, phenomenologically modeled as a statistical feedback process within the framework of a generalized thermostatistics. Preferred embodiments implement solutions to a generalized form of the Black-Scholes differential equation, using risk-free asset valuation techniques in some cases.

46 Claims, 16 Drawing Sheets

OTHER PUBLICATIONS

Borland, Lisa, "*Closed Form Option Pricing Formulas Based on a Non-Gaussian Stock Price Model With Statistical Feedback*," (published on Apr. 15, 2002) downloaded from the Internet at http://xxx.lanl.gov/abs/cond-mat/0204331v1 , pp. 1-9.

Borland, Lisa, "*A Theory of Non-Gaussian Option Pricing*," (published on May 3, 2002) downloaded from the Internet at http://xxx.lanl.gov/abs/cond-mat/0205078v1, pp. 1-43.

Michael, F., et al., "*Black-Scholes-Like Derivative Pricing With Tsallis Non-Extensive Statistics*" (published on Apr. 11, 2002) downloaded from the Internet at http://xxx.lanl.gov/abs/cond-mat/0204261v1, pp. 1-10.

Michael, F., et al., "*Black-Scholes-Like Derivative Pricing With Tsallis Non-Extensive Statistics*," (published Apr. 30, 2002) downloaded from the Internet at http://xxx.lanl.gov/abs/cond-mat/0204261v2, pp. 1-9.

Santa Fe Institute, "*The Santa Fe Institute Presents on International Workshop on Interdisciplinary Applications of Ideas from Nonextensive Statistical Mechanics and Thermodynamics*," Announcement (dated Mar. 11, 2002) and Abstracts (dated Mar. 12, 2002), downloaded from the Internet on Dec. 11, 2002 at http://discuss.santafe.edu/nonextensive2001/ and http://discuss.santafe.edu/nonextensive2001/abstracts, 20 pages.

Merton, Robert C., "Theory of Rational Option Pricing," *The Bell Journal of Economics and Management Science*, vol. 4, Issue 1 (Spring 1973), pp. 141-183.

Black, Fischer and Scholes, Myron, "The Pricing of Options and Corporate Liabilities," *The Journal of Political Economy*, vol. 81, Issue 3 (May-Jun. 1973), pp. 637-654.

Borland, Lisa, "Microscopic Dynamics of the Nonlinear Fokker-Planck Equation: A Phenomenological Model," *Physical Review E.*, vol. 57, No. 6, Jun. 1998, pp. 6634-6642.

* cited by examiner

METHOD AND SYSTEM FOR NON-GAUSSIAN PRICING OF OPTIONS AND OTHER DERIVATIVES

TECHNICAL FIELD OF THE INVENTION

The invention pertains to methods and systems for determining the price of financial instruments of the type known as derivatives. In some embodiments, the invention pertains to methods and systems for determining the price of stock options.

BACKGROUND OF THE INVENTION

The expression "financial instrument" is used in a broad sense herein to denote any financial instrument, including but not limited to stocks, bonds, currency, mortgages, futures contracts, and indices.

The term "derivative" is used herein (including in the claims) to denote a financial instrument which derives its value from an underlying financial instrument. An option (e.g., a stock option) is an example of a derivative. Other examples of derivatives are options on currencies and currency futures.

It is well known that the distributions of empirical returns do not follow the log-normal distribution upon which many celebrated results of finance are based. For example, Black F. and Scholes, M., Journal of Political Economy, 81, 637-659, May-June 1973, and Merton R. C., Bell Journal of Economics and Management Science, 4, 141-183, Spring 1973 derive the prices of options and other derivatives of the underlying stock based on such a model. While of great importance and widely used, such theoretical option prices do not match the observed ones. In particular, the Black-Scholes model underestimates the prices of away-from-the-money options, in the sense that the implied volatilities of options of various strike prices form a convex function (sometimes referred to as the "volatility smile"). If the Black-Scholes model were perfect, the implied volatilities would form a flat line as a function of strike price.

There have been several modifications to the standard models in an attempt to correct for these discrepancies, for example those described in Hull, *Options, Futures, and other Derivatives*, Third Edition, Prentice-Hall, 1997; Eberlein, Keller, and Prause, Journal of Business 71, No. 3, 371-405, 1998; Merton, *Journal of Financial Economics*, 125-144 (May 1976); Dupire, *RISK Magazine*, 18-20 (January 1994); Andersen and Andreasen, *Review of Derivatives Research*, 4, 231-262 (2000); Hull and White, Journal of Finance, 42, 281-300 (1987); and Bouchaud and Potters, *Theory of Financial Risks*, Cambridge (2000). However, those approaches are complicated or ad-hoc, and do not result in any manageable closed form solution, which is an important result of the Black and Scholes approach.

In contrast, the present invention provides closed form solutions for pricing of derivatives (e.g., European options). The inventive approach is based on a new class of stochastic processes which allow for statistical feedback as a model of the returns of the underlying financial instruments. The distributions of returns implied by these processes closely match those found empirically. In particular they capture features such as the fat tails and peaked middles which are not captured by the standard class of lognormal distributions. The stochastic model employed in the present invention derives from a class of processes, described in Borland L., Phys. Rev. E 57, 6634, 1998, that have been recently developed within the framework of statistical physics, namely within the active field of Tsallis nonextensive thermostatistics (aspects of which are described at Tsallis C., J. Stat. Phys. 52, 479, 1988, and Curado E. M. F. and Tsallis C., J. Phys. A 24 L69, 1991; 24, 3187, 1991; and 25 1019, 1992).

The stochastic processes employed to model stock returns in accordance with the present invention can be interpreted as if the driving noise follows a generalized Wiener process governed by a fat-tailed Tsallis distribution of index q>1. For q=1, the Tsallis distribution coincides with a Gaussian and the standard stock-price model is recovered. However, for q>1 these distributions exhibit fat tails and appear to be good models of real data, as shown in FIG. 1. In FIG. 1, the empirical distribution of the log daily price returns (ignoring dividends and non-trading days) to the demeaned Standard & Poor's 500 index is plotted. Returns were normalized by the sample standard deviation of the series which is 19.86% annualized, and then binned. For comparison, the solid curve superimposed on the data is a Tsallis distribution of index q=1.43. It is clear from FIG. 1 that the Tsallis distribution provides a much better fit to the empirical distribution than a lognormal distribution (the dashed curve also shown).

Another example is shown in FIG. 2, which plots the distribution of high frequency log returns for 10 NASDAQ high-volume stocks. The data points are generated as in FIG. 1, but indicate returns at 1 minute intervals rather than daily intervals. As in FIG. 1, returns are normalized by the sample standard deviation. The solid curve superimposed on the empirical data is a Tsallis distribution of index q=1.43 which provides a very good fit to the data. Stock return movements according to the stochastic processes employed in accordance with the present invention have been simulated, and the inventor has found that the distributions of returns over varying time-lags match corresponding empirical observations very well.

The standard model for stock price movement is that $$S(t+\tau) = S(\tau)e^{Y(t)}, \quad (1)$$

where t is a time delay, time interval, or timescale, and where Y follows the stochastic process $$dY = \mu dt + \sigma d\omega \quad (2)$$

across t, the drift, $\mu$, is the mean rate of return of the stock, and $\sigma^2$ is the variance of the logarithmic return of the stock. We can set $\tau=0$ without loss of generality, and do so below. The driving noise $\omega$ is a Brownian motion defined with respect to a probability measure F. It represents a Wiener process and has the property $$E^F[d\omega(t)d\omega(t')] = dt dt' \delta(t-t') \quad (3)$$

where the notation $E^F[\ ]$ means the expectation value with respect to the measure F. Note that the conditional probability distribution of the variable $\omega$ satisfies the Fokker-Planck equation $$\frac{\partial P(\omega, t \mid \omega', t')}{\partial t} = \frac{1}{2} \frac{\partial^2}{\partial \omega^2} P(\omega, t \mid \omega', t')) \quad (4)$$

and is distributed according to $$P(\omega(t), t \mid \omega(t'), t') = \frac{1}{\sqrt{2\pi(t-t')}} \exp\left(-\frac{(\omega(t) - \omega(t'))^2}{2(t-t')}\right) \quad (5)$$

In addition one chooses $t'=t_0$ and $\omega(t_0)=0$ that this defines a Wiener process, which is distributed according to a zero-mean Gaussian. It is well known that this model gives a normal distribution with drift $\mu(t-t_0)$ and variance $\sigma^2(t-t_0)$ for the variable Y. This can be seen for example by rewriting Equation (2) as $$d\left(\frac{Y-\mu t}{\sigma}\right) = d\omega \quad (6)$$

which indicates that we can substitute $$\omega = (Y-\mu t)/\sigma \quad (7)$$

into Eq (5). This obtains the well-known log-normal distribution for the stock returns over timescale T, after inserting $Y=\ln S(T)/S(0)$:

$$P(\ln S(T), T | \ln S(0), 0) = N \exp\left(-\frac{\ln\frac{S(T)}{S(0)} - \mu(T)^2}{2\sigma^2(T)}\right) \quad (8)$$

Based on this stock-price model, Black and Scholes were able to establish a pricing model to obtain the fair value of options on the underlying stock whose price is S. The present invention provides a new derivative pricing model based on a new class of stochastic processes that, until the present invention, had not been used for derivative pricing.

SUMMARY OF THE INVENTION

In a class of preferred embodiments, the invention is a method and system for pricing a derivative (e.g., an option), based on a non-Gaussian model of returns. When the underlying financial instrument is a stock, the inventive method and system assumes a non-Gaussian model of stock returns. The dynamics of the underlying financial instrument (e.g., stock) are assumed to follow a stochastic process with anomalous nonlinear diffusion, phenomenologically modeled as a statistical feedback process within the framework of the generalized thermostatistics proposed by Tsallis. Preferred embodiments implement solutions to a generalized form of the Black-Scholes differential equation, using risk-free asset valuation techniques in some cases.

Some embodiments of the invention determine the price of a European option (e.g., a European call option), by implementing a closed form solution for the generalized Black-Scholes differential equation, characterized by the entropic index q which arises within the Tsallis framework.

The standard Black-Scholes pricing equations are recovered as a special case (in which q=1) of the generalized Black-Scholes differential equation employed in preferred embodiments of the invention. Some preferred embodiments model the distribution of stock returns using the generalized Black-Scholes differential equation with q circa 1.5.

In accordance with the invention, the random noise affecting movements in the prices of derivatives is modeled as evolving according to an anomalous Wiener process characterized by a Tsallis distribution of index q. This non-Gaussian noise satisfies a statistical feedback process which ultimately depends on a standard Brownian motion. The inventive approach yields a better description than using standard normally distributed noise because it assumes processes whose distributions match empirical ones much more closely, while including the standard results as a special case. Based on these novel stochastic processes, a generalized form of the Black-Scholes differential equation, closed form option pricing formulae, and many other useful results are derived in accordance with the invention.

Results generated in accordance with the invention for the behavior of the price of a European call option capture well-known features of real option prices. For example, the inventive method (with q=1.5) assigns higher values to both in-the-money and out-of-the-money versions of European call options than does the standard Black-Scholes model. Analysis of option prices determined by the invention reveals implied volatilities that show a smile feature which qualitatively behaves much like empirical observations. The dependency of the call price (determined by preferred embodiments of the invention) on each variable has been calculated and plotted for values q=1 and q=1.5. As q increases, option prices and partials determined in accordance with the invention deviate significantly from those determined conventionally (with q=1).

Other aspects of the invention are numerical pricing routines which can be used both for European and American options. These entail solving the generalized Black Scholes differential equation of the invention (Equation 32 with Equation 15, set forth below). Results from both methods agree well, and have been confirmed by calculations involving Monte Carlo simulations of the underlying stochastic process.

In another class of embodiments, the invention is a method and system for pricing a derivative of a financial instrument based on a non-Gaussian model of returns, where the model assumes statistical feedback.

In another class of embodiments, the invention is a method and system for pricing an option based on a dividend paying financial instrument (e.g., a dividend paying stock). In another class of embodiments, the invention is a method and system for pricing an option based on a futures contract of an underlying financial instrument.

Other aspects of the invention are systems programmed to implement any embodiment of the inventive method, and storage media which store code suitable for programming processors to implement any embodiment of the inventive method.

BRIEF DESCRIPTION OF THE DRAWINGS

FIG. 7 is a set of three graphs of call option price as a function of the parameter q for three sets of option parameters, where each set includes T=0.4, S(0)=50 and r=0.06, the strike price is K=45 (in-the-money) for the top graph, the strike price is K=50 (at-the-money) for the middle graph, and the strike price is K=55 (out-of-the-money) for the bottom graph.

DETAILED DESCRIPTION OF PREFERRED EMBODIMENTS

Figure 1:
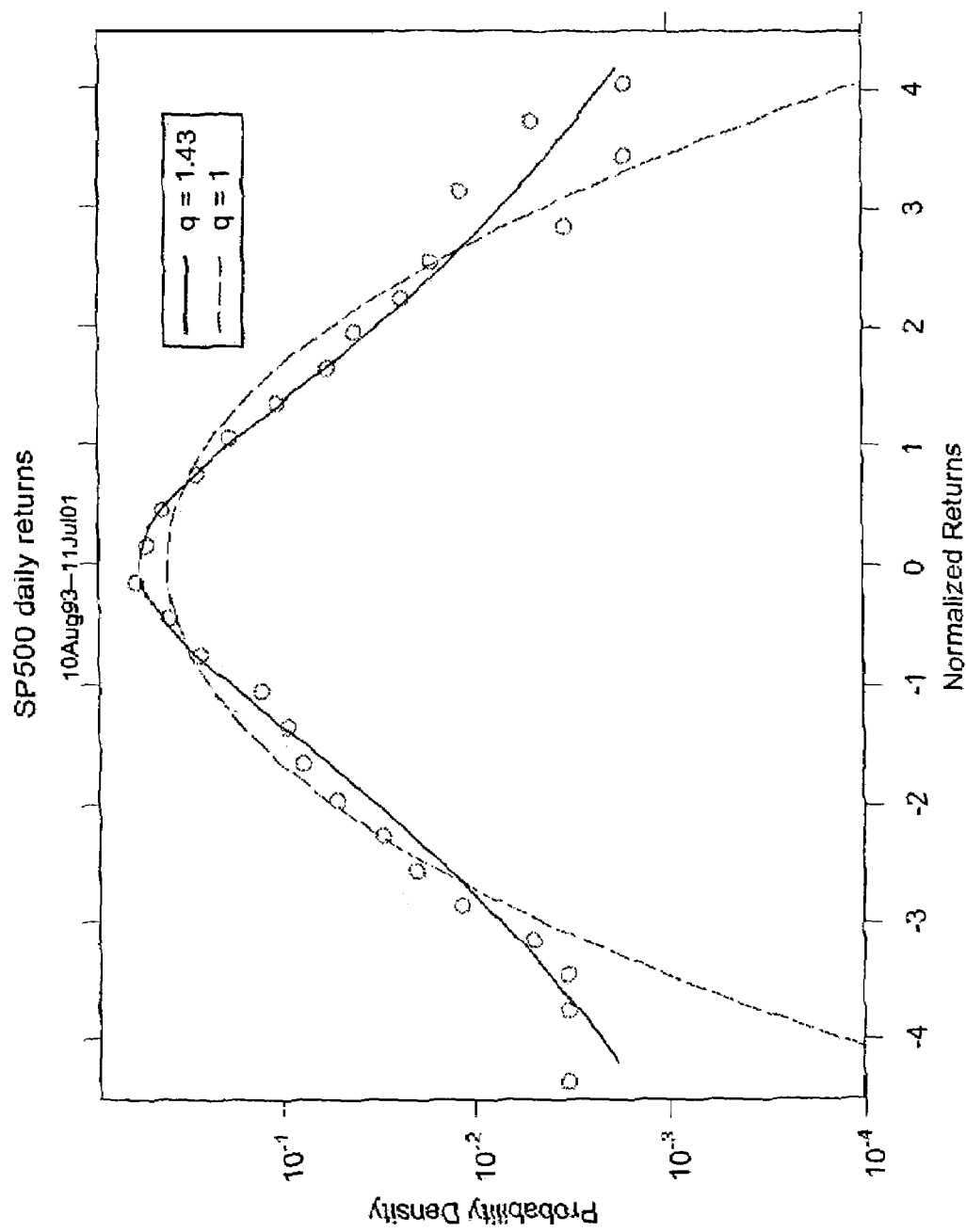
FIG. 1 is a plot of empirical distribution of log daily price returns (ignoring dividends and non-trading days) from the demeaned Standard & Poor's 500 index, in which the returns have been normalized by the sample standard deviation of the series (19.86%, annualized) and then binned. The solid curve superimposed on the data is a Tsallis distribution of index q=1.43. The dashed curve superimposed on the data is a lognormal distribution (with q=1).
Figure 2:
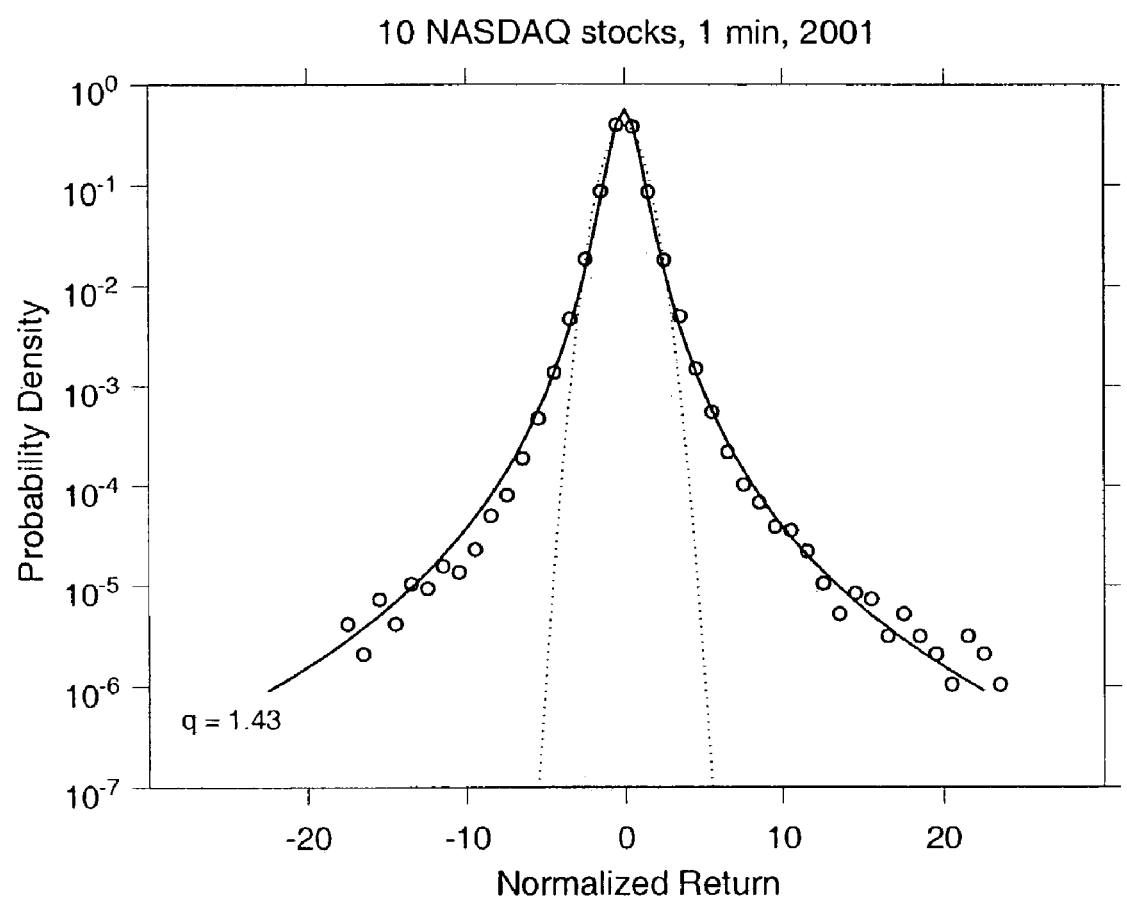
FIG. 2 is a plot of empirical distribution of high frequency log returns for 10 NASDAQ high-volume stocks. The data points are generated as in FIG. 1, but with returns at one minute intervals rather than daily intervals. The solid curve superimposed on the data is a Tsallis distribution of index q=1.43.

In a class of embodiments, the invention determines the price of a derivative whose underlying financial instrument is a stock whose price is $S=S(t+\tau)=S(\tau)e^{Y(t)}$, where Y(t) evolves across t, and t is a time delay, time interval, or timescale. We set τ=0 without loss of generality. In other embodiments, the invention determines the price of a derivative whose underlying financial instrument is not a stock but whose price varies with time as $S=S(t+\tau)=S(\tau)e^{Y(t)}$, where Y(t) evolves across t, and t is a time delay, time interval, or timescale. Again, we set τ=0 without loss of generality. Although much of the following discussion assumes (for specificity) that the underlying financial instrument (of the derivative to be priced) is a stock, the discussion applies equally well to derivatives whose underlying financial instruments are not stocks.

In embodiments in which the invention is a method for determining the price of a derivative whose underlying financial instrument is a stock whose price is $S=S(0)e^{Y(t)}$, the invention assumes that the logarithmic return of the stock (the natural logarithm of the return of the stock) follows the process $$dY = \mu dt + \sigma d\Omega \quad (9)$$

across the timescale t, and models the drive noise Ω as being drawn from a non-Gaussian fat-tailed distribution. The drift, μ, is the mean rate of return, and σ² is a variance parameter of the logarithmic return of the stock. Equation (9) results in a member of the ensemble of returns at each timescale t.

To model the drive noise Ω, we assume that Ω follows the statistical feedback process $$d\Omega = P(\Omega)^{(1-q)/2} d\omega \quad (10)$$

described in the above-referenced paper by Borland L., Phys. Rev. E 57, 6634, 1998. Here ω is zero-mean Gaussian noise as defined above. For q=1, Ω reduces to ω and the standard model is recovered. The probability distribution of the variable Q evolves according to the nonlinear Fokker-Planck equation $$\frac{\partial}{\partial t} P(\Omega, t \mid \Omega', t') = \frac{1}{2} \frac{\partial}{\partial \Omega^2} P^{2-q}(\Omega, t \mid \Omega', t'). \quad (11)$$

The conditional probability P that solves this system is given by so-called Tsallis distributions (or q-Gaussians $P_q$)

$$P_q(\Omega, t \mid \Omega', t') = \frac{1}{Z(t)} (1 - \beta(t)(1-q)(\Omega - \Omega')^2)^{\frac{1}{1-q}} \quad (12)$$

$$\beta(t) = c^{\frac{1-q}{3-q}} ((2-q)(3-q)(t-t'))^{-2/(3-q)} \quad (13)$$

$$Z(t) = ((2-q)(3-q)c(t-t'))^{\frac{1}{3-q}} \quad (14)$$

By choosing $t'=t_0=0$ (without loss of generality) and Ω(0)=0, we obtain a generalized Wiener process, distributed according to a zero-mean Tsallis distribution $$P_q(\Omega, t \mid 0, 0) = \frac{1}{Z(t)} (1 - \beta(t)(1-q)(\Omega)^2)^{\frac{1}{1-q}} \quad (15)$$

The index q is known as the entropic index of the generalized Tsallis entropy. The q-dependent constant c is given by $$c = \beta N^2 \quad (16)$$

$$N = \int_{-\infty}^{\infty} (1 - (1-q)\beta\Omega^2)^{\frac{1}{1-q}} d\Omega \qquad (17)$$

for any β. In the limit q→1 the standard theory is recovered, and $P_q$ becomes a Gaussian. In that case, the standard Gaussian driving noise of Equation (2) is also recovered. For q<1 these distributions exhibit a so-called cutoff resulting in regimes where $P_q$=0. Thus, below we will only consider values of q>1 for which the distributions exhibit fat tails. There is also a natural limit at q=3 after which value the distributions are no longer normalizable. Another important point which constrains the realistic range of q-values is the fact that the variance of the Tsallis distributions is given by $$E[\Omega^2(t)] = \frac{1}{(5-3q)\beta(t)} \qquad (18)$$

See Tsallis C., Levy S. V. F., Souza A. M. C., Maynard R., Phys. Rev. Lett. 75, 3589, 1995. Clearly, this expression diverges for q≧5/3. Since we are only interested in processes with finite variance, we typically assume 1≦q<5/3, which covers the values of empirical interest. However, it is contemplated that the invention is also valid and useful in the case that q≧5/3.

It should be appreciated that in some embodiments of the invention, the entropic index q is time-dependent (i.e., q depends on the time delay, time interval, or timescale t).

In typical embodiments of the invention, the non-Gaussian distribution $P_q$ is symmetric. In other embodiments of the invention, the non-Gaussian distribution $P_q$ is asymmetric. For example, $P_q$ would be asymmetric if $P_q$ were a function of X, where X is a non-symmetric function of log returns Y. Alternatively, $P_q$ would be asymmetric if the statistical feedback process characterized by $P_q$ pertains to a variable X, where X is a non-symmetric function of log returns Y.

The particular form of $P_q$ which we next introduce here has the property that $P_q$ becomes sharply peaked as $t-t_0$ approaches zero. In other words, it approaches a δ-function as $t-t_0 \to 0$, which corresponds to the fact that the stock returns are known with certainty at time $t_0$. Let us now see what effect the driving noise Ω has on the log stock return Y. We can write $$d\left(\frac{Y - \mu t}{\sigma}\right) = d\Omega \qquad (19)$$

This allows us to substitute $$\Omega = (Y-\mu t)/\sigma \qquad (20)$$

into Eq (12) to obtain the distribution for the variable Y(t)=ln S(t+τ)/ln S(τ), setting τ=0 (without loss of generality):

$$P_q(\ln S(t), t \mid \ln S(0), 0) = \frac{1}{Z(t)}\left(1 - \tilde{\beta}(t)(1-q)\left(\ln\frac{S(T)}{S(0)} - \mu(T)\right)^2\right)^{\frac{1}{1-q}} \qquad (21)$$

with $\tilde{\beta} = \beta(t)/\sigma^2$. In other words, we see that the distribution of log-returns ln S(t)/S(0) over the interval t follows a Tsallis distribution. This result is consistent with empirical evidence for several markets, e.g., the S&P 500 (as shown in FIG. 1) with q≈1.5.

The way in which the stochastic equation, Eq (9) with Eq (10), is preferably interpreted, in describing the evolution of a particular trajectory starting at value $\Omega(t_0)$, is that it generates members Y(t) of an ensemble of returns, distributed on a timescale t according to a non-Gaussian, Tsallis distribution of index q. With such an interpretation, the model is applicable to pricing both standard and exotic options, except perhaps for options which are explicitly dependent on the history of evolution of a particular price path.

At each timescale, the distribution is of Tsallis form of index q. The noise distribution at each timescale evolves according to a Tsallis distribution, with variance scaling anomalously with timescale.

The model underlying preferred embodiments of the invention exhibits a statistical feedback into the system, from the macroscopic level characterized by P, to the microscopic level characterized by the dynamics of Ω, and thereby ultimately by ln S. This scenario is simply a phenomenological description of the underlying dynamics. For example, in the case of stock prices, we can imagine that the statistical feedback is really due to the interactions of many individual traders whose actions all will contribute to shocks to the stock price which keep it in equilibrium. Their collective behavior can be summarized by the statistical dependency in the noise term of the stochastic model for ln S. This yields a nonhomogenous reaction to the price: depending on the value of q, rare events (i.e. extreme returns) will be accompanied by large reactions. The net effect of this is that extreme returns will tend to be followed by large returns in either direction. On the other hand, if the price takes on less extreme values, then the size of the noise acting upon it is more moderate.

The model, underlying some embodiments of the invention, for log-returns reads $$d \ln S = \mu dt + \sigma d\Omega \qquad (22)$$

with dΩ given by Eq(10) implying that the stock price itself follows $$dS = \left(\mu + \frac{\sigma^2}{2} P_q^{1-q}\right) S dt + \sigma S d\Omega \qquad (23)$$

This can be abbreviated as $$dS = \tilde{\mu} S dt + \sigma S d\Omega \qquad (24)$$

where $$\tilde{\mu} = \mu + \frac{\sigma^2}{2} P_q^{1-q}. \qquad (25)$$

$P_q$ (given by Eq(15)) is a function of Ω(t), and thus $\tilde{\mu}$ itself ultimately varies with time. The term $$\frac{\sigma^2}{2} P_q^{1-q}$$

which appears in Equations (23) and (25) is a noise-induced drift term. For q=1 the standard noise-induced drift term is recovered. This stock-price model implies that log returns are distributed according to the Tsallis distribution of Eq(21).

A fully equivalent treatment of the above-discussed problem is to assume that the dynamics of the stock price is instead given by Eq(131) as discussed below.

We next consider price movements of a derivative of an underlying financial instrument (e.g., an option of an underlying stock S) modeled by Equation (24). We denote the price of the derivative by f(S) and use the stochastic (Ito) calculus to see that $$df = \frac{df}{dS}dS + \frac{df}{dt}dt + \frac{1}{2}\frac{d^2f}{dS^2}(\sigma^2 P_q^{1-q})dt \qquad (26)$$

where in turn dS is given by Eq(24) with Eq(10). After insertion we get $$df = \left(\frac{df}{dS}\mu S + \frac{df}{dt}dt + \frac{1}{2}\frac{d^2f}{dS^2}(\sigma^2 S^2 P_q^{1-q})\right)dt + \frac{df}{dS}\sigma S P_q^{\frac{1-q}{2}} dw \qquad (27)$$

In the limit q→1, the standard equations for price movements and derivatives thereof are recovered.

It is important to realize that the noise terms driving the price of the shares S is the same as that driving the price f of the derivative. It should be possible to invest one's wealth in a portfolio of shares and derivatives in such a way that the noise terms cancel each other, yielding the so-called risk-free portfolio ("Π"). The risk-free portfolio can be expressed as $$\Pi = -f + \frac{df}{dS}S \qquad (28)$$

A small change in this portfolio is given by $$\Delta\Pi = -\Delta f + \frac{df}{dS}\Delta S \qquad (29)$$

which, after insertion of the above-derived expressions for f and S, becomes $$\Delta\Pi = \left(\frac{df}{dt} + \frac{1}{2}\frac{d^2f}{dS^2}\sigma^2 S^2 P_q^{1-q}\right)\Delta t \qquad (30)$$

The return on this portfolio must be the risk-free rate of return, r, otherwise there would be arbitrage opportunities. The risk-free rate of return, r, is the rate of return on a risk-free investment (a widely used estimate of the risk-free rate of return is the yield of U.S. Government Treasury Bills). In view of this, the inventor has derived the following generalized version of the Black-Scholes differential equation (which is employed in preferred embodiments of the invention):

$$\frac{df}{dt} + \frac{1}{2}\frac{d^2f}{dS^2}\sigma^2 S^2 P_q^{1-q} = r\left(f - \frac{df}{dS}S\right) \qquad (31)$$

which can be rewritten as $$\frac{df}{dt} + rS\frac{df}{dS} + \frac{1}{2}\frac{d^2f}{dS^2}\sigma^2 S^2 P_q^{1-q} = rf \qquad (32)$$

where $P_q$ evolves according to Eq(15). In the limit q→1, the standard Black-Scholes differential equation is recovered from Equation (32). Equation (32) is solved subject to boundary conditions that are specific to the derivative. For example, when the derivative is a European call (or put) option, the boundary conditions include the payoff at expiration time T, and when the derivative is an American option, the boundary conditions include the payoff at time t<T (where T is the expiration time).

The differential equation of Eq (31) or (32) does not explicitly depend on μ, the rate of return of the stock, and does explicitly depend only on the risk-free rate and the variance. However, there is a dependency on Ω(t) through the term $P_q$. But it is possible to express Ω(t) in terms of S(t) through Eq(20), which implies that there is an implicit dependency on μ. Therefore, to be consistent with risk-free pricing theory, we should first transform our original stochastic equation for S into a martingale before we apply the above analysis. This will not affect the results other than that μ will be replaced by the risk-free rate r. We shall show how this can be done. It will result in the risk-free representation, $$\Omega(t) = (1/\sigma)\left((\ln S(t)/\ln S(0)) - rt + (\sigma^2/2)\int_0^t P_q^{1-q}(\Omega(s))\,ds\right) \qquad (32A)$$

By standardizing the distributions $P_q(\Omega(S))$ via the appropriate variable transformations $$\Omega(s) = (\sqrt{\beta(t)/\beta(s)})\Omega(t) \qquad (32B)$$

we can explicitly solve for Ω(t) as a function of S(t) and r as the solution of $$-(\sigma^2/2)\alpha t^{2/(3-q)} + (1-q)\alpha t^{2/(3-q)}(\beta(t)/2)\sigma^2\Omega^2 + \sigma\Omega + rt = \ln S(t)/S(0). \qquad (32C)$$

Equation (32) can be solved using equation (15), with Ω(0)=Ω($t_0$)=0, and β and Z expressed as in Eq (13), (14), (16), and (17), and Ω expressed as the solution of equation (32C). In addition, one needs to specify the boundary conditions, which are determined by derivative (for example, when then the derivative is an option, the boundary conditions are determined by the payoff of the option). Numerically solving equation (32) provides a solution for the pricing of many different kinds of derivatives, including American options (i.e., options that can be exercised at any time t<T, where T is the expiration date).

We now show how the above-described process can be transformed into a martingale. Assume that there is a call option with strike price K written on the underlying asset S(t). Its value will be given by $$C(T) = \max[S(T) - K, 0] \qquad (33)$$

at expiration time T. At earlier times t<T, the value of C(T) is unknown but one can forecast it using the information I(t) available up until time t, so $$E^F[C(T)|I(t)]=E^F[\max[S(T)-K,0]|I(t)] \quad (34)$$

where the notation $E^F[C]$ means that the expectation E of the random variable C is taken with respect to the probability measure F under which the dynamics of C (and thereby S) are defined. In addition, we must require that the fair market value C(t), discounted accordingly in the risk-neutral framework at the risk-free rate, is equal to $E^F[\max[S(T)-K,0]|I(t)]$.

However, this is only true if $e^{-rt}S(t)$ satisfies the martingale condition $$E^F[e^{-rt}S(t)|S(u),u<t]=e^{-ru}S(u) \quad (35)$$

This means that under the measure F, the conditional expectation of S(t) discounted at the risk-free rate is best given by the discounted value of S at the previous time u. Alternatively one can say that a martingale is a stochastic process whose trajectories display no obvious trends or periodicities. A submartingale is a process that, on average, is increasing. For example, using the stock price model of Eq(24), we get for $G(t)=e^{-rt}S(t)$ $$dG=(\mu-r)Gdt+G\sigma d\omega \quad (36)$$

Clearly, G is a submartingale because of the non-zero drift term, whereas the process $$dG-(\mu-r)Gdt=G\sigma d\omega \quad (37)$$

is a martingale. Subtracting the drift from a submartingale G in a somewhat similar manner is the basis of the so-called Doob-Meyer decomposition. If the drift term can be explicitly determined, then it is possible to decompose G into a drift component and a martingale component and thereby determine the fair market value of C(t)

However, this method is not usually used. Instead, it is common in asset-pricing to find synthetic probabilities Q under which the drift of the underlying stochastic process vanishes, i.e., find Q so that $$E^Q[e^{-rt}S(t)|S(u),u<t]=e^{-ru}S(u) \quad (38)$$

In order to transform the probability-dependent stochastic processes described above into martingales, we need to generalize several of the concepts used in the standard asset-pricing theory. Therefore, we shall first review the standard case.

If a stochastic process is given by $$dY=\mu dt+\sigma d\omega \quad (39)$$

where $\omega$ is a Brownian noise term associated with a probability measure F, then it is not a martingale because of the drift term $\mu dt$. According to the Girsanov theorem, one can however find an equivalent measure Q corresponding to an alternative noise term dz, such that the process is transformed into a martingale, by rewriting it as $$dY = \sigma\left(\frac{\mu}{\sigma}dt + dw\right) = \sigma dz \quad (40)$$

The new driving noise term z is related to $\omega$ through $$z = \int_0^t u\,ds + \omega \quad (41)$$

$$u = \frac{\mu}{\sigma}. \quad (42)$$

The noise term z is defined with respect to the equivalent Martingale measure Q which is related to F through the Radon-Nikodym derivative $$\zeta(t) = \frac{dQ}{dF} = \exp\left(-\int_0^t u\,dw - \frac{1}{2}\int_0^t u^2\,ds\right). \quad (43)$$

Under the measure F, the original random variable $\omega$ follows a zero-mean process with variance equal to t. Under that same measure, the new noise term z(t) is normal with non-zero mean equal to $\int_0^t u\,ds$ and variance t. However, with respect to the equivalent probability measure Q one can easily verify that z(t) is normal with 0 mean and variance t. This follows because the relationship $$E^Q[T]=E^F[\zeta y] \quad (44)$$

holds. In the above discussion, u, $\mu$, and $\sigma$ may all depend on the variable Y(t) as well. The only criterion which must be satisfied for the Girsanov theorem to be valid is that $$\exp\left(-\frac{1}{2}\int_0^t u^2\,ds\right) < \infty \quad (45)$$

which implies that $\zeta$ is a square integral martingale. (For details see Oksendal B., Stochastic Differential Equations, Fifth Edition, Springer, 1998).

The effect of the martingale transformation is further illustrated by the conditional probability distribution of the variable Y: With respect to $\omega$, P is given by $$P(Y,t|(t_0),t_0) = \frac{1}{\sigma\sqrt{2\pi(t-t_0)}}\exp\left(\frac{-((Y-Y(t_0))-\mu(t-t_0))^2}{\sigma^2(t-t_0)}\right) \quad (46)$$

which is Gaussian with drift $\sigma^2(t-t_0)$. On the other hand, with respect to z, the probability distribution of Y is given by $$P(Y,t|Y(t_0),t_0) = \frac{1}{\sigma\sqrt{2\pi(t-t_0)}}\exp\left(\frac{-(Y-Y(t_0))^2}{\sigma^2(t-t_0)}\right) \quad (47)$$

This is a Gaussian distribution with zero drift.

We next formulate similar equivalent martingale measures for the class of probability dependent stochastic processes employed in the present invention. Let the original process be given by $$dY=\mu dt+\sigma d\Omega \quad (48)$$

with $\Omega$ defined as in Eq(10), namely $$d\Omega = P_q^{\frac{1-q}{2}} d\omega \qquad (49)$$

where $\omega$ is normally distributed $\delta$-correlated noise, associated with the mea-sure F. $P_q(\Omega)$ is the Tsallis distribution of index q discussed above Eq(15), so with respect to the measure F, $P(Y,t|Y(t_0),t_0)$ is given by the non-zero drift distribution $$P(Y, t | Y(t_0), t_0) = \frac{1}{Z(t)} \Big(1 - \tilde{\beta}(t)(1-q)(y - Y(t_0) - \mu(t-t_0)^2\Big)^{\frac{1}{1-q}}. \qquad (50)$$

We are now in the position to define equivalent Martingale measures exactly as in the standard case by writing $$dY = \sigma P_q^{\frac{1-q}{2}} \left( \frac{\mu}{\sigma P_q^{\frac{1-q}{2}}} dt + d\omega \right) \qquad (51)$$

$$= \sigma P_q^{\frac{1-q}{2}} dz \qquad (52)$$

This new driving noise z is associated with the measure Q and reads $$dz = \frac{\mu}{\sigma P_q^{\frac{1-q}{2}}} dt + d\omega \qquad (53)$$

Let us now define $$u = \frac{\mu}{\sigma P_q^{\frac{1-q}{2}}} \qquad (54)$$

Since $P_q$ is simply a particular function of $\Omega$, which in turn can be expressed as a function of Y via $\Omega=(Y-\mu t)/\sigma$, we see that we are now dealing with a general function u(Y), so our analysis will be formally equivalent to that of the standard case. In particular, since $P_q$ is a non-zero bounded function of Y the criterion of Eq(45) is valid and thereby also the Girsanov theorem. The Martingale equivalent measure Q under which z is defined is given by Eq (43) with u as in Eq (54). Under Q, the noise term z is a zero-mean Brownian motion. It should be appreciated that z and Q are merely synthetic measures. They are purely mathematical constructions that do not reflect the true probabilities or dynamics of Y. The most important point to be utilized in implementing the invention is the following. Since z is under Q a zero-mean Gaussian noise, then the noise term defined by $$d\Omega = P_q(\Omega)^{(1-q)/2} dz \qquad (55)$$

is equivalent to that defined by Eq(10) and the distribution of the variable $\Omega$ is therefore given by a Tsallis distribution of index q. Consequently, under Q, the variable Y as defined by the stochastic equation Eq(52) is also distributed according to a zero-drift Tsallis distribution, namely $$P(Y(t), t | Y(0), 0) = \frac{1}{Z(t)} (1 - \tilde{\beta}(t)(1-q)(Y - Y(0))^2)^{\frac{1}{1-q}}. \qquad (56)$$

Another aspect of the invention is a Monte Carlo method for determining the price, f(S), of a derivative whose underlying financial instrument has the price $S=S(t)=S(0)e^{Y(t)}$, where Y(t) evolves across timescale t. The price of the derivative is determined by the results of simulating many runs of the stochastic process of the underlying instrument's return (with respect to the martingale equivalent noise), under pay-off conditions which are specific to the derivative whose price is to be determined, where the stochastic process is determined in accordance with the invention by a non-Gaussian model of the price S. For example, each simulation run determines a simulated value of the return of the underlying instrument, a simulated value of f, the derivative price, is determined from each such simulated value of the underlying instrument's return, and the average of all the simulated values of the derivative price is identified as the price, f, of the derivative. In a class of preferred embodiments, the simulation step is performed by simulating runs of the following stochastic process (under pay-off conditions specific to the derivative whose price is to be determined):

$$dY=(r-(\sigma^2/2)P_q^{1-q})dt+\sigma P_q^{(1-q)/2}d\omega \qquad (56A)$$

where $\omega$ is a standard Gaussian noise, $\sigma^2$ is a variance parameter of the logarithmic return of the underlying financial instrument, q is an entropic index, $P_q$ is the above-discussed conditional probability, and r is the risk-free rate of return.

Equation (56A) results from the following model for evolution of the price S across the timescale t:

$$dS=\mu Sdt+\sigma Sd\Omega \qquad (56B)$$

where $\Omega$ is drive noise, $\mu$ is the mean rate of return of the underlying financial instrument, $\sigma^2$ is a variance parameter of the logarithmic return of the underlying financial instrument, and the drive noise $\Omega$ follows a statistical feedback process $$d\Omega=P_q(\Omega)^{(1-q)/2}d\omega.$$

Equation (56A) results from the Eq (56B) model, rather than the model discussed above with reference to Eq(22). The inventive method determines the same price for the derivative of interest, regardless of whether the method assumes the Eq(56B) model or the Eq(22) model.

If the underlying financial instrument is a dividend paying instrument (e.g., a dividend paying stock) that pays dividends at the rate w, the parameter r in Eq(56A) should be replaced by r–w. Thus, the price, f(S), of a derivative of such a dividend-paying instrument can be determined by a variation on the Monte Carlo method discussed above with reference to Eq(56A), in which many runs of the following stochastic process are simulated (under pay-off conditions specific to the derivative):

$$dY=((r-w)-(\sigma^2/2)P_q^{1-q})dt+\sigma P_q^{(1-q)/2}d\omega \qquad (56C)$$

where $\omega$ is a standard Gaussian noise, $\sigma^2$ is a variance parameter of the logarithmic return of the underlying financial instrument, q is an entropic index, and $P_q$ is the above-discussed conditional probability.

We next describe how to transform a discounted stock price into a martingale. Let the discounted stock price be $$G=Se^{-r(t-t_0)} \qquad (57)$$

such that $$\ln G = \ln S - rt. \quad (58)$$

Without loss of generality, we set $t_0=0$. The model for S is given by Eq(24), yielding $$dG = (\tilde{\mu} - r)Gdt + \sigma Gd\Omega \quad (59)$$

for the discounted stock price $G = Se^{-rt}$. The dynamics of $\Omega$ is defined with respect to the measure F as in Eq(10). Here, $\tilde{\mu}$ includes a noise-induced drift term and reads as in Eq(25). Stochastic integration shows that at time T we have $$G(T) = G(0)\exp\left((\tilde{\mu} - r)T - \frac{\sigma^2}{2}\int_0^T P_q^{1-q} dt + \int_0^T \sigma P_q^{\frac{1-q}{2}} dz_s\right) \quad (60)$$

$$= G(0)\exp\left((\mu - r)T + \int_0^T \sigma P_q^{\frac{1-q}{2}} dz_s\right) \quad (61)$$

$$S(T) = S(0)\exp\left(\int_0^T \sigma P_q^{\frac{1-q}{2}} dw_s + \int_0^T \left(\tilde{\mu} - \frac{\sigma^2}{2} P_q^{1-q}\right) dt\right) \quad (62)$$

which implies $$S(T) = S(0)\exp\left(\int_0^T \sigma P_q^{\frac{1-q}{2}} dw_s + \mu T\right). \quad (63)$$

These expressions are derived based on the original representation of the price dynamics, given by Eq(59). However it is clear that Eq(59) is not a martingale, but can be transformed into one following the same ideas as discussed above. We get $$dG = \sigma G P_q^{\frac{1-q}{2}} dz \quad (64)$$

with $$dz = \left(\frac{\tilde{\mu} - r}{\sigma P_q^{\frac{1-q}{2}}}\right) dt + d\omega \quad (65)$$

$$= \left(\frac{\mu - r + \frac{\sigma^2 P_q^{1-q}}{2}}{\sigma P_q^{\frac{1-q}{2}}}\right) dt + d\omega \quad (66)$$

Notice that $P_q$ depends on $\Omega$, which in turn depends on S as was shown in Eq(20). S itself can be expressed in terms of G via Eq(57). Therefore, the rules of standard stochastic calculus can be applied, and the martingale equivalent measure Q associated with z is obtained from Eq(43) by setting $$u = \frac{\mu - r + \frac{\sigma^2 P_q^{1-q}}{2}}{\sigma P_q^{\frac{1-q}{2}}} \quad (68)$$

Taking the log of Eq(64) we get $$d\ln G = -\frac{\sigma^2}{2} P_q^{1-q} dt + \sigma P_q^{\frac{1-q}{2}} dz \quad (69)$$

After stochastic integration and transforming back to S we obtain $$S(T) = S(0)\exp\left(\int_0^T \sigma P_q^{\frac{1-q}{2}} dz_s + \int_0^T \left(r - \frac{\sigma^2}{2} P_q^{1-q}\right) ds\right) \quad (70)$$

If we compare the expression Eq(70) for S under Q with that under F as given by Eq(62), we see that the difference between the two is that the rate of return $\tilde{\mu}$ has been replaced by the risk-free rate r. This recovers the same result as in the standard risk-free asset pricing theory. (Exactly the same result, Eq(70), would be obtained had we instead started with the stock price model Eq(131) mentioned below. It is apparent that this would have been equivalent to replacing $\mu$ with the risk free rate r).

We have yet to discuss the evaluation of the $P_q$ related terms which appear in the above expressions. Two points are of importance here: The first being that the term of type $$\int_0^T P_q^{\frac{1-q}{2}} d\Omega$$

is simply equal to the random variable $\Omega(T)$. The second important point (discussed below) is to realize that the distributions $P_q(\Omega(s))$ at arbitrary times s can be mapped onto the distributions $P_q(\Omega(T))$ at a fixed time T via the appropriate variable transformation $$\Omega(s)) = \sqrt{\frac{\beta(T)}{\beta(s)}} \Omega(T) \quad (73)$$

Using these notions we can write S(T) of Eq(70) as $$S(T) = S(0)\exp\left(\Omega(T) + rT - \frac{\sigma^2}{2}\alpha T^{\frac{2}{3-q}} + \right. \quad (74)$$

$$\left. (1-q)\frac{\sigma^2}{2}\int_0^T \frac{\beta(t)}{Z(t)^{1-q}} \Omega^2(t) dt\right)$$

$$= S(0)\exp\left(\Omega(T) + rT - \frac{\sigma^2}{2}\alpha T^{\frac{2}{3-q}}(1 - (1-q)\beta(T)\Omega^2(T))\right)$$

with $$\alpha = \frac{1}{2}(3-q)((2-q)(3-q)c)^{\frac{q-1}{3-q}}$$

This expression for S(T) recovers the usual one for q=1. For q>1, a major difference relative to the standard case is the $\Omega^2$ (T) term in the exponential, which appears as a result of the noise induced drift. The implications of this term for the option prices will be described below.

Let us now revisit Eq(32), the generalized Black-Scholes differential equation. In the risk-neutral world, we must use Eq(69) to obtain an expression for $P_q(\Omega)$. Rewriting that equation yields $$d\frac{\left(Y - rt + \frac{\sigma^2}{2}P_q^{1-q}(\Omega)\right)}{\sigma} = d\Omega \quad (75)$$

Formally, this expression is identical to Eq(20) except that $\tilde{\mu}$ (related to $\mu$, through Eq(25)) has been replaced with r. Furthermore, integrating Eq(75) up to time t results in Eq(74) (with T=t), from which it is possible to solve for $\Omega(t)$ explicitly in terms of S(t). This implies that, in the martingale representation, $P_q(\Omega(T))$ can be expressed as a function of the volatility $\sigma$, the risk-free rate r, S(t) and S(0). Most importantly, the implicit dependency on $\mu$ through $\Omega$ is replaced by a dependency on r.

The generalized differential equation Eq(32) can thus be solved numerically, which is one method for obtaining derivative (e.g., option) prices in accordance with the invention. However, it is possible to go a step further and obtain closed-form derivative prices (e.g., option prices) in accordance with the invention. This is done by transforming asset prices into martingales and then taking expectations. In the following paragraphs we show how this is done, and why option prices obtained in that way indeed satisfy Eq(32).

We first determine a closed-form solution for the price of one type of derivative, an option known as a European option. We assume that the European option depends on a stock whose price is S(t). The European option has a price f given by its expectation value in a risk-free (martingale) world as $$f(C) = E^Q[e^{-rT}C] \quad (76)$$

If the payoff on this option depends on the stock price at the expiration time T so that $$C = h(S(T)) \quad (77)$$

then the option price is as follows in accordance with the invention:

$$f = e^{-rT}E^Q\left[f\left(S(0)\exp\left(\int_0^T \sigma P_q^{\frac{1-q}{2}}dz_s + \int_0^T\left(r - \frac{\sigma^2}{2}P_q^{1-q}\right)ds\right)\right)\right] \quad (78)$$

In the special case of q=1, the standard expression of the option price (see for example Oksendal B., Stochastic Differential Equations, Fifth Edition, Springer, 1998) is recovered from Equation (78). However, in that case it is argued that under Q, the random variable $$x(T) = \int_0^T \sigma dz \quad (79)$$

is normally distributed with variance $$\delta^2 = \int_0^T \sigma^2 dt \quad (80)$$

yielding the following expression for the price of a European option:

$$f = \frac{e^{-rT}}{\delta\sqrt{2\pi}}\int_R h\left[S(0)\exp\left(x + \int_0^T\left(r - \frac{1}{2}\sigma^2(s)\right)ds\right)\right]\exp\left(-\frac{x^2}{2\delta^2}\right)dx \quad (81)$$

The key difference in the inventive approach now is that the random variable $$\frac{x(T)}{\sigma} = \int_0^T P_q^{\frac{1-q}{2}}dz_s = \Omega(T) \quad (82)$$

is not normally distributed, but is assumed (in accordance with the invention) to be distributed according to the Tsallis distribution of index q, Eq(15). The pricing equation Eq(78) can be written (in accordance with an embodiment of the invention) as $$f = \frac{e^{-rT}}{Z(T)}\int_R h\left[S(0)\exp(\sigma\Omega(T) + rT - \frac{\sigma^2}{2}\alpha T^{\frac{2}{3-q}}(1 - (1-q)\beta(T)\Omega^2(T)))\right]$$
$$(1 - \beta(T)(1-q)\Omega(T)^2)^{\frac{1}{1-q}}d\Omega_T \quad (83)$$

with $\alpha = \frac{1}{2}(3-q)[(2-q)(3-q)c]^{(q-1)/(3-q)}$, $c = \beta N^2$, and $$N = \int_{-\infty}^{\infty}(1 - (1-q)\beta\Omega^2)^{\frac{1}{1-q}}d\Omega.$$

In the limit q=1, equation (83) recovers the standard result.

A European call option is such that the option holder has the right to buy the underlying stock S at the strike price K, on the day of expiration T. Depending on the value of S(T), the payoff of such an option is $$C = \max[S(T) - K, 0] \quad (84)$$

In other words, if S(T)>K then the option will have value (it will be in-the-money). In a more concise notation, the price x of such an option becomes $$x = E^Q[e^{-rT}C] \quad (85)$$

$$= E^Q[e^{-rT}S(T)]_D - E^Q[e^{rT}K]_D \quad (86)$$

$$= J_1 - J_2 \quad (87)$$

where the subscript D stands for the set {S(T)>K}. To calculate $J_1$ and $J_2$, we shall proceed along the same lines as in the standard case [as described, for example, in Musiela M. and Rutkowski M., Martingale Methods in Financial Modelling Springer, 1997 (Applications of Mathematics 36)]. We have $$J_2 = e^{-rT}K\left(\int_R \frac{1}{Z(T)}(1 - \beta(T)(1-q)\Omega(T)^2)^{\frac{1}{1-q}}d\Omega_T\right) \quad (88)$$

-continued $$= e^{-rT} K P_Q \{S(T) > K\} \quad (89)$$

where the notation $P_Q\{S(T)>K\}$ is just a more concise notation for the expression on the line above. $P_Q$ corresponds to the integral over the Tsallis distribution (which was defined with respect to the measure Q), and the argument $\{S(T)>K\}$ refers to the fact that we are considering only the set D. We get $$J_2 = e^{-rT} K P_Q \{S(T) > K\} \quad (90)$$

$$= e^{-rT} K P_Q \left\{ S(0) \exp\left(\sigma \Omega + rT - \frac{\sigma^2}{2} \alpha T^{\frac{2}{3-q}} (1 - (1 - q)\beta(T)\Omega^2)\right) > K \right\}$$

$$= e^{-rT} K P_Q \left\{ -\frac{\sigma^2}{2} \alpha T^{\frac{2}{3-q}} (1 - (1-q)\beta(T)\Omega^2) + \sigma \Omega + rT > \ln \frac{K}{S(0)} \right\}$$

The inequality $$-\frac{\sigma^2}{2} \alpha T^{\frac{2}{3-q}} + (1-q)\alpha T^{\frac{2}{3-q}} \beta(T) \frac{\sigma^2}{2} \Omega^2 + \sigma \Omega + rT > \ln \frac{K}{S(0)} \quad (91)$$

is satisfied in between the two roots $$s_{1,2} = \frac{-1}{\alpha T^{\frac{2}{3-q}}(1-q)\sigma\beta(T)} \pm$$

$$\left( \frac{1}{\alpha T^{\frac{2}{3-q}}(1-q)\sigma^2\beta(T)^2} - \frac{2}{(1-q)\alpha T^{\frac{2}{3-q}}\sigma^2\beta(T)} \left( rT + \ln\frac{S(0)}{K} - \frac{\sigma^2}{2}\alpha T^{\frac{2}{3-q}} \right) \right)^{\frac{1}{2}} \quad (92)$$

This is a very different situation from the standard case, where the inequality is linear and the condition $S(T)>K$ is satisfied for all values of the random variable greater than a threshold. In implementing the present invention, due to the noise induced drift, values of $S(T)$ in the risk-neutral world are not monotonically increasing as a function of the noise. As $q \to 1$, the larger root goes toward $\infty$, recovering the standard case. But as q gets larger, the tails of the noise distribution get larger, as does the noise induced drift which tends to pull the system back. As a result we obtain $$J_2 = \frac{e^{-rT} K}{Z(T)} \int_{s_1}^{s_2} (1 - (1-q)\beta(T)\Omega^2)^{\frac{1}{1-q}} d\Omega \quad (93)$$

The remaining term $J_1$ can be determined in a similar fashion. We have $$J_1 = E^Q[e^{-rT} S(T)]_D \quad (94)$$

This can be written as $$J_1 = E^Q[e^{-rT} S(T)]_D \quad (95)$$

$$= P_Q[e^{-rT} S(T)]\{S(T) > K\}$$

$$= P_Q \left[ e^{-rT} \exp\left( S(0) \exp\left( \sigma \Omega(T) + rT - \frac{\sigma^2}{2} \alpha T^{\frac{2}{3-q}} (1 - (1-q)\beta(T)\Omega^2(T)) \right) \right) \right] \{S(T) > K\}$$

The domain $\{S(T)>K\}$ is the same as that found for $J_2$, and is defined as the region between the two roots of Eq(92). We obtain $$J_1 = \frac{S(0)}{Z(T)} \int_{s_1}^{s_2} \exp\left( \sigma \Omega - \frac{\sigma^2}{2} \alpha T^{\frac{2}{3-q}} + (1-q)\alpha T^{\frac{2}{3-q}} \beta(T) \frac{\sigma^2}{2} \Omega^2 \right) \quad (96)$$

$$(1 - (1-q)\beta(T)\Omega^2)^{\frac{1}{1-q}} d\Omega$$

It is customary in the standard Black-Scholes case to express the integrals in Eq(96) and Eq(90) in terms of a standardized (0,1) noise process. It is possible to do the same when implementing the invention, via the appropriate variable transformation $$\Omega_N = \Omega(T) \sqrt{\frac{\beta(T)}{\beta_N}} \quad (97)$$

We thus obtain the following expression for the price of a European call option (which determines its price in a class of embodiments of the invention):

$$c = S(0) M_q(d_1, d_2, b(\Omega_N)) - e^{-rT} K N_q(d_1, d_2) \quad (98)$$

where we introduce the notation $$N_q(d_1, d_2) = \frac{1}{Z_N} \int_{d_1}^{d_2} (1 - (1-q)\beta_N \Omega_N^2)^{\frac{1}{1-q}} d\Omega_N \text{ and} \quad (99)$$

$$M_q(d_1, d_2, b(\Omega_N)) = \quad (100)$$

$$\frac{1}{Z_N} \int_{d_1}^{d_2} \exp(b(\Omega_N))(1 - (1-q)\beta_N \Omega_N^2)^{\frac{1}{1-q}} d\Omega_N \text{ with}$$

-continued $$b(\Omega_N) = \sigma\sqrt{\frac{\beta_N}{\beta(T)}}\,\Omega_N - \frac{\sigma^2}{2}\alpha T^{\frac{2}{3-q}}(1-(1-q)\beta_N\Omega_N^2) \text{ with } \alpha =$$ (101)

$$\frac{1}{2}(3-q)((2-q)(3-q)c)^{\frac{q-1}{3-q}} \text{ and } Z_N =$$

$$\int_{-\infty}^{\infty}(1-(1-q)\beta_N\Omega_N^2)^{\frac{1}{1-q}}d\Omega_N.$$

The limits of the standardized integrals are given as $$d_{1,2} = \frac{s_{1,2}}{\sigma\sqrt{\beta_N/\beta(T)}}$$ (102)

with $s_{1,2}$ as in Eq(92). By choosing $\beta_N$ as $$\beta_N = \frac{1}{5-3q}$$ (103)

the variance of the noise distribution will be normalized to 1 for each value of q. In the limit q=1, the standard Black-Scholes pricing equations are recovered.

We next discuss the equivalence of the solution f found via the martingale asset pricing approach in accordance with the invention, and the solution of the generalized Black-Scholes differential equation (32) also in accordance with the invention. We use arguments based on those in Shreve S., Lectures on Finance prepared by Chalasani P. and Jha S, www.cs.cmu.edu/chal/shreve.html, for the standard case. The expression for f of Eq(70) can be written for $u \geq t$ as $$S(u) = S(t)\exp\left(\int_t^u \sigma P_q^{\frac{1-q}{2}}dz_s + \int_t^u \left(r - \frac{\sigma^2}{2}P_q^{1-q}\right)ds\right)$$ (104)

This implies that $$S(T) = S(0)\exp\left(\int_0^T \sigma P_q^{\frac{1-q}{2}}dz_s + \int_0^T \left(r - \frac{\sigma^2}{2}P_q^{1-q}\right)ds\right)$$ (105)

can trivially be rewritten as $$S(T) = S(T)\exp\left(\int_t^T \sigma P_q^{\frac{1-q}{2}}dz_s + \int_t^T \left(r - \frac{\sigma^2}{2}P_q^{1-q}\right)ds\right)$$ (106)

$$= XY$$ (107)

$$X = S(t)$$ (108)

$$Y = \exp\left(\int_t^T \sigma P_q^{(1-q)/2}dz_s + \int_t^T (r - (\sigma^2/2)P_q^{1-q})ds\right)$$ (109)

with the important properties that X is measurable with information I(t) available up until time t, and Y is independent of that information.

We then define $$v(t, X) = E^Q[h(S(T)) | I(t)]$$ (100)

$$= E^Q\left[h\left(X\exp\left(\int_t^T \sigma P_q^{\frac{1-q}{2}}dz_s + \int_t^T \left(r - \frac{\sigma^2}{2}P_q^{1-q}\right)ds\right)\right)\right]$$ (111)

where h is an arbitrary function. We now look at the value of this expectation conditioned on information I(t) available up until time t and obtain $$E^Q[h(S(T)) | I(t)] = E^Q[h(XY)] | I(t)]$$ (112)

$$= E^Q[h(X) | I(t)]$$ (113)

$$= v(t, X)$$ (114)

$$= v(t, S(t))$$ (115)

where the independence of Y on I(t) has been used. This is exactly the same result as obtained in the standard case, and it implies that $v(t, S(t)), 0 \leq t \leq T$, is a martingale (see Shreve S., Lectures on Finance prepared by Chalasani P. and Jha S, www.cs.cmu.edu/chal/shreve.html). Now we use Ito's formula to write $$dv(t, S(t)) = \left[\frac{dv}{dt} + rS\frac{dv}{dS} + \frac{1}{2q}\sigma^2 S^2 P_q^{1-q}\frac{d^2v}{dS^2}\right]dt + \sigma S\frac{dv}{dS}P_q^{\frac{1-q}{2}}dz$$ (116)

But because v is a martingale, we know that the sum of the dt terms must equal 0. This implies that $$\frac{dv}{dt} + rS\frac{dv}{dS} + \frac{1}{2}\sigma^2 S^2 P_q^{1-q}\frac{d^2v}{dS^2} = 0$$ (117)

for $0 \leq t \leq T$, which is consistent with the Feynman-Kac theorem (cf Shreve S., Lectures on Finance prepared by Chalasani P. and Jha S, www.cs.cmu.edu/chal/shreve.html), albeit now generalized in accordance with the invention.

Recall that the price of a contingent claim paying h(S(T)) can be written as Eq(76) so that $$f = E^Q[e^{-r(t-t)}C]$$ (118)

$$= e^{-r(T-t)}E^Q[h(S(T))]$$ (119)

$$= e^{-r(T-t)}v(S, t)$$ (120)

implying that $$v(S, t) = e^{r(T-t)}f$$ (121)

Insertion of this form of v into Eq(117) immediately yields the inventive generalized Black-Scholes differential equation of Eq(32).

We have thus shown that the option price f obtained by way of transforming the asset price into a martingale and discounting it accordingly (as represented by Eq(76)) in turn implies that the generalized Black-Scholes equation of Eq(32) must be valid. Therefore, equivalent solutions can be found either by solving Eq(32) or Eq(76).

European Call options have been evaluated in accordance with the invention using Eq (98), and these results have been confirmed by numerically solving Eq (32) on a grid under appropriate boundary conditions. It is of particular interest to evaluate call options and see how the option prices and partials change as q moves away from 1, which recovers the Black-Scholes scenario.

Figure 3:
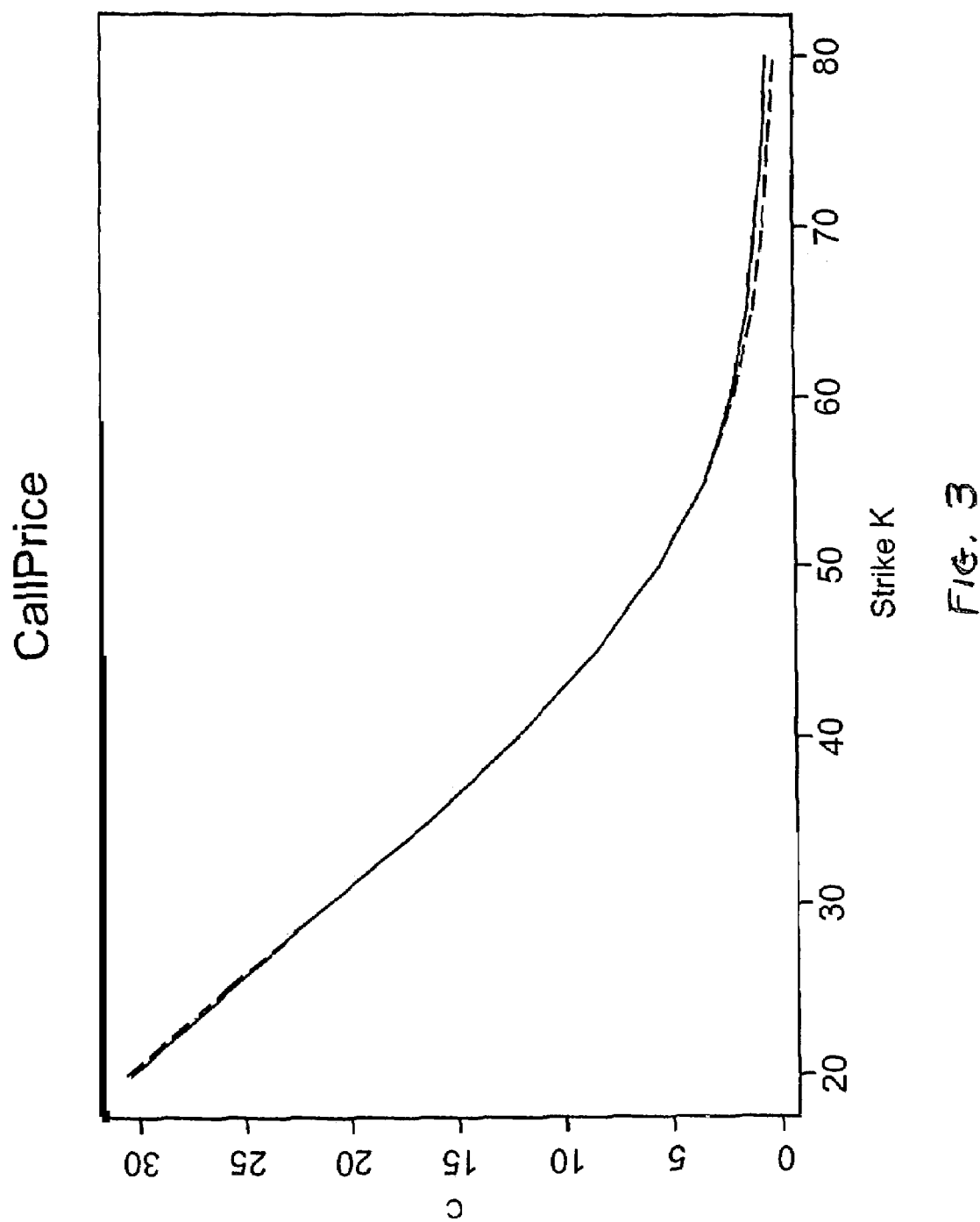
FIG. 3 is a graph of a call option price as a function of the strike price determined by the standard Black-Scholes model (q=1), and in accordance with an embodiment of the invention (with q=1.5), where σ is chosen such that the at-the-money prices are equal.
Figure 4:
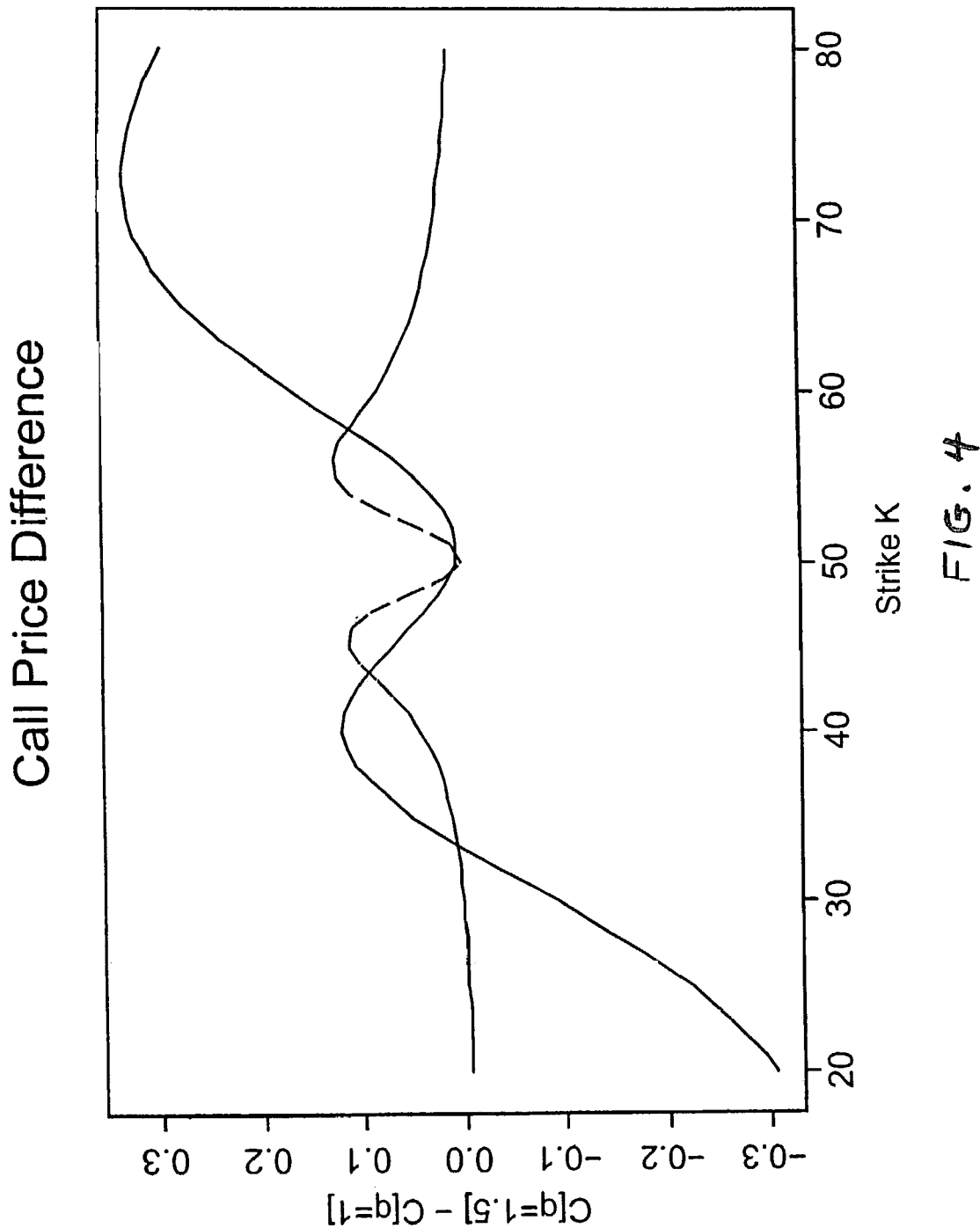
FIG. 4 is a graph of the difference between call option price determined by the standard Black-Scholes model (q=1) and in accordance with an embodiment of the invention (with q=1.5) as a function of strike price, for two sets of option parameters (with S(0)=50 and r=0.06, times expressed in years, and r and σ in annual units, for both sets): T=0.6, σ=0.3 for q=1, and σ=0.297 for q=1.5 for the solid curve; and T=0.05, σ=0.3 for q=1, and σ=0.41 for q=1.5 for the dashed curve.

Results of such calculations are shown in FIGS. 3-15. FIG. 3 depicts the call option price as a function of the strike price, as determined by the standard Black-Scholes model (q=1) (the dashed curve) and in accordance with an embodiment of the invention with q=1.5 (the solid curve), where σ is chosen such that the at-the-money prices are equal (σ=0.3 for q=1, and σ=0.299 for q=1.5), with T=0.6, S(0)=50 and r=0.06. The differences between the two pricing models are more apparent in FIG. 4, from which it is clear that both in-the-money and out-of-the money options are valued higher with q=1.5, except for very deep-in-the-money options which are valued lower. This behavior can be understood intuitively as follows. The distribution of Ω for q=1.5 has fatter tails than the q=1 model. Consequently, if the stock price gets deep out-of-the-money, then the noise may still produce shocks that can bring the stock back in-the-money again. This results in higher option prices for deep out-of-the-money strikes. Similarly, if the option is deep in-the-money, the noise can produce shocks to the underlying which can bring the price out-of-the-money again. In addition, it can be seen from the expression Eq(70) for S(T), that large shocks will increase the value of the noise-induced drift term which will decrease the probability of realizing higher stock returns. This results in lower option prices for deep-in-the-money strikes. On the other hand, for intermediate values around-the-money, there will be a higher probability to land both in- or out-of-the-money which leads to an increase in the option price, relative to the standard q=1 model.

Figure 5:
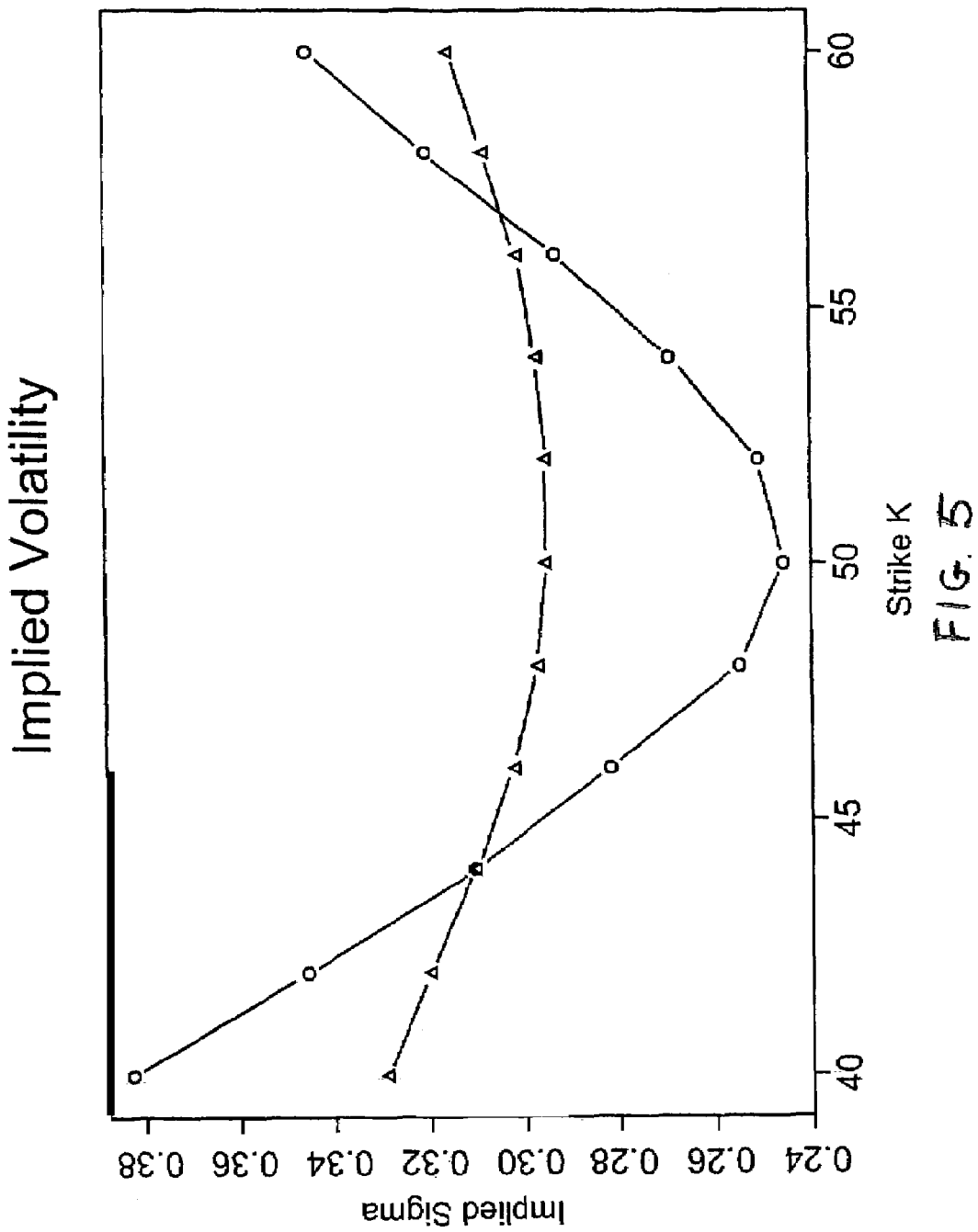
FIG. 5 is a graph of implied volatility as a function of strike price, determined in accordance with an embodiment of the invention (with q=1.5), for two sets of option parameters: with σ=0.3, S(0)=50 and r=0.06 for both sets; T=0.4 for one set (the curve with circles); and T=0.1 for the other set (the curve with triangles). The implied volatilities graphed in FIG. 5 capture features seen in real options data (e.g., the smile is more pronounced for the smaller value of 7).

The resulting volatilities which the standard model must assume in order to match the values obtained for the q=1.5 model, are plotted in FIG. 5, for T=0.1 and T=0.6. We clearly see that these implied volatilities (shown here for values ±20% around-the-money) form a smile shape, very similar to that which is implied by real market data. The higher volatility q=1 Gaussian models that are successively needed as one moves away-from-the money essentially reflects the fact that the tails of the q=1.5 model would have to be approximated by higher volatility Gaussians, whereas the central part of the q=1.5 noise distribution can be approximated by lower volatility Gaussians.

Figure 6:
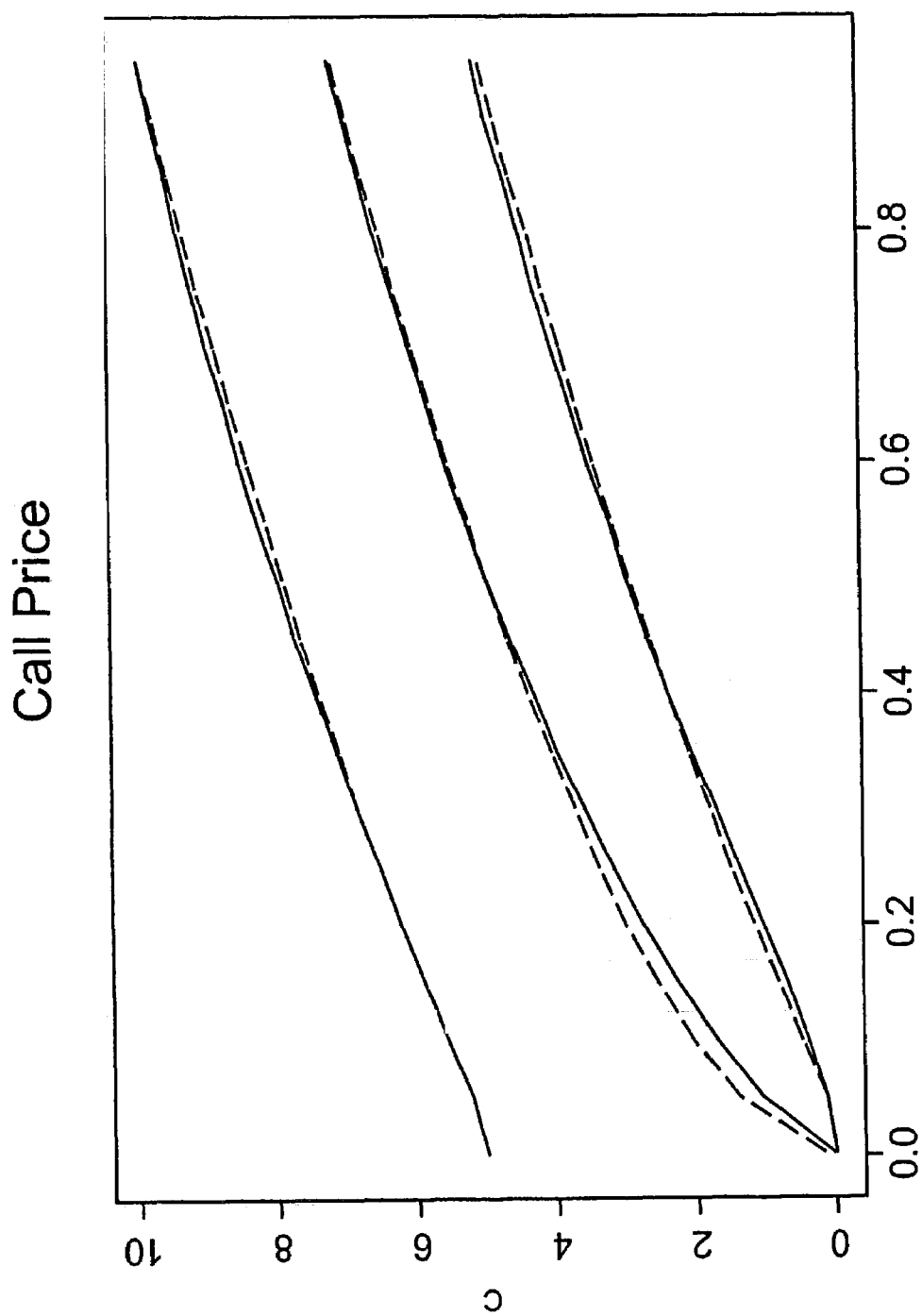
FIG. 6 is a graph of price of a call option as a function of time to expiration T, with σ=0.3, S(0)=50 and r=0.06, as determined by the standard Black-Scholes model (q=1) (the dashed curves) and in accordance with an embodiment of the invention with q=1.5 (the solid curves), for three different strike prices: K=45 (in-the-money) for the top curves; K=50 (at-the-money) for the middle curves; and K=55 (out-of-the-money) for the bottom curves.
Figure 8:
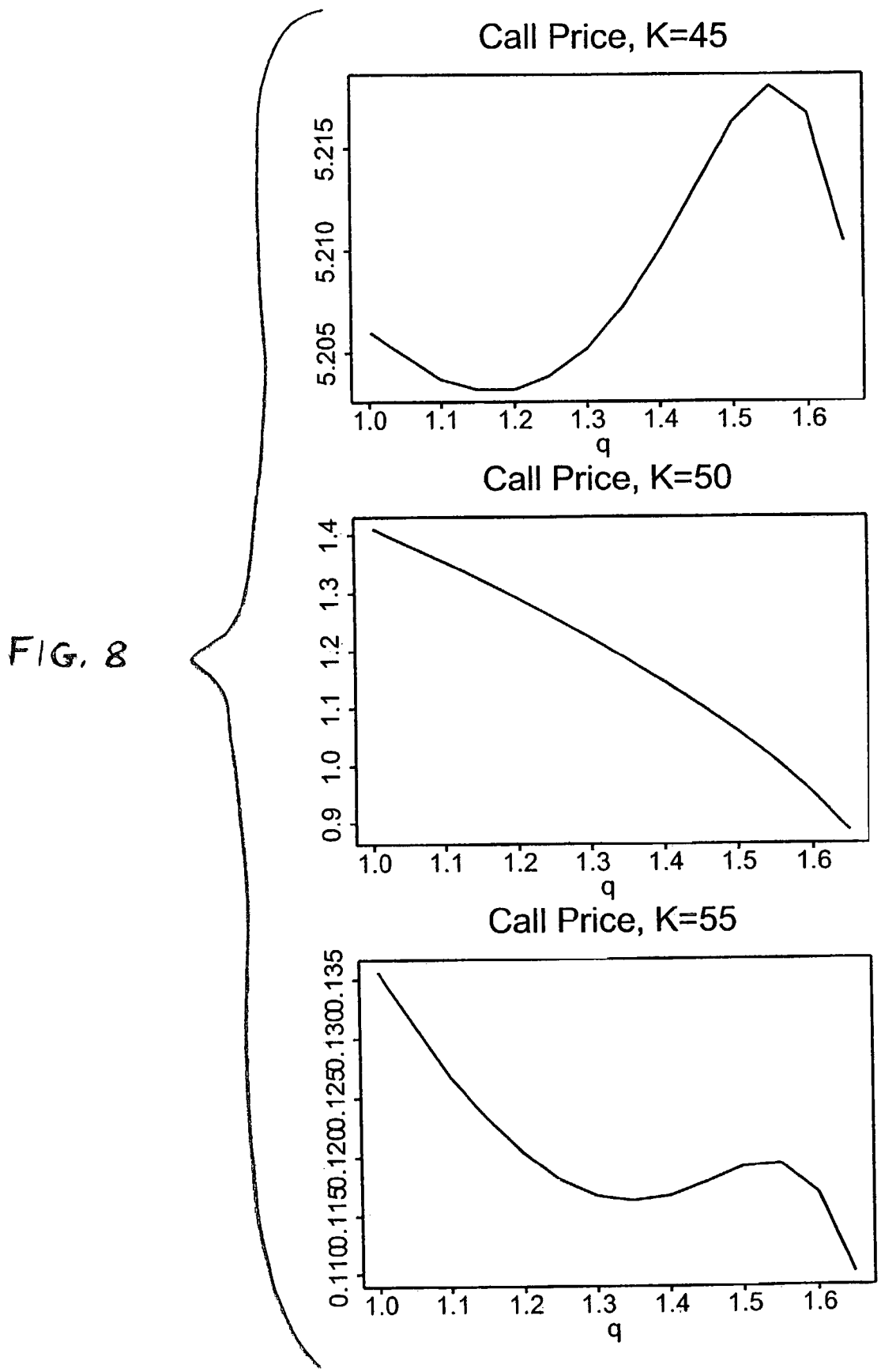
FIG. 8 is a set of three graphs of call option price as a function of the parameter q for three sets of option parameters, where each set includes T=0.05, S(0)=50 and r=0.06, the strike price is K=45 (in-the-money) for the top graph, the strike price is K=50 (at-the-money) for the middle graph, and the strike price is K=55 (out-of-the-money) for the bottom graph.
Figure 9:
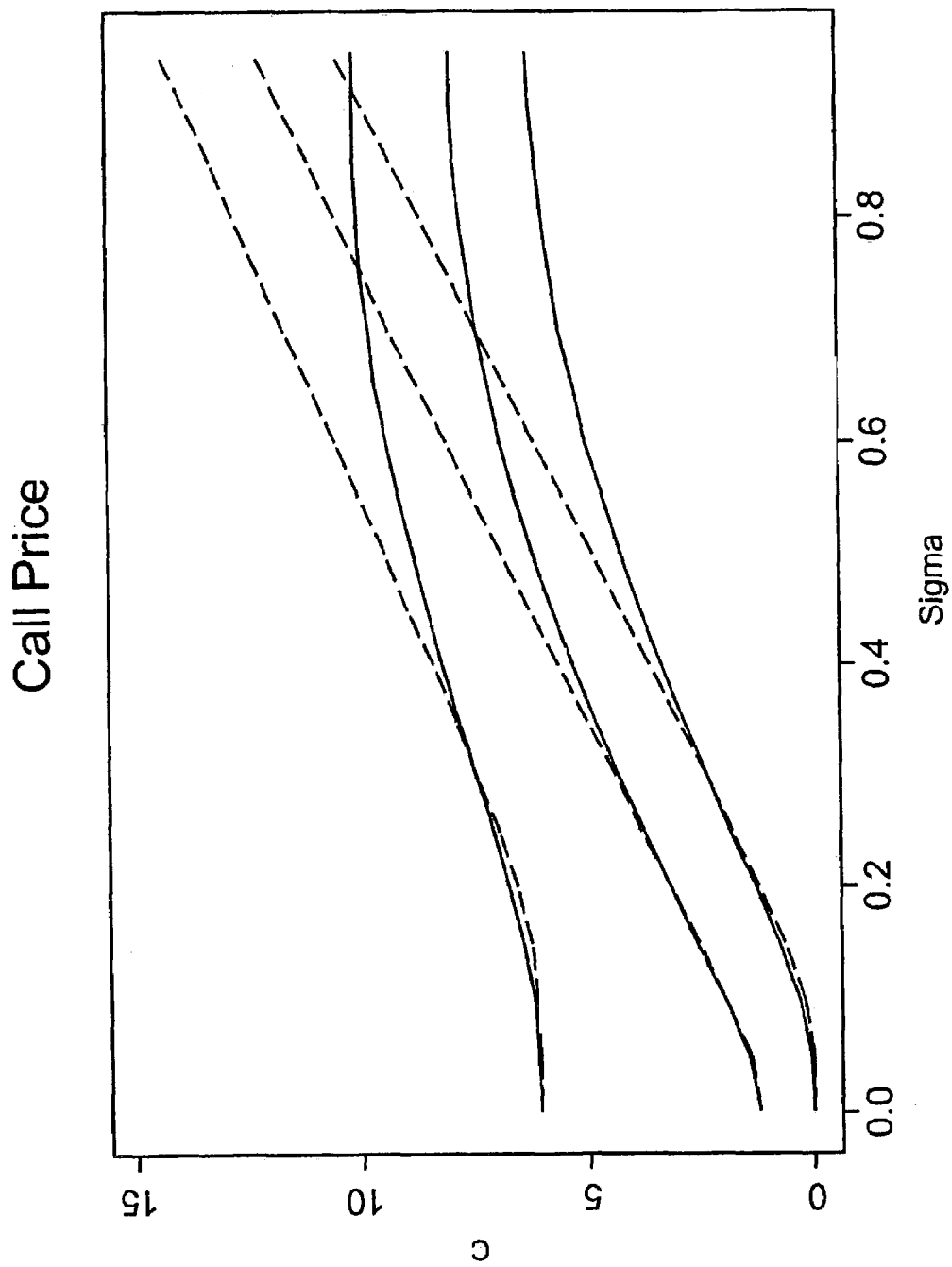
FIG. 9 is a graph of call option price as determined by the standard Black-Scholes model (q=1) (dashed curves) and in accordance with an embodiment of the invention with q=1.5 (solid curves), as a function of σ, with S(0)=50, r=0.06, and T=0.4, where the strike price is K=45 (in-the-money) for the top curves, K=50 (at-the-money) for the middle curves, and K=55 (out-of-the-money) for the bottom curves.
Figure 10:
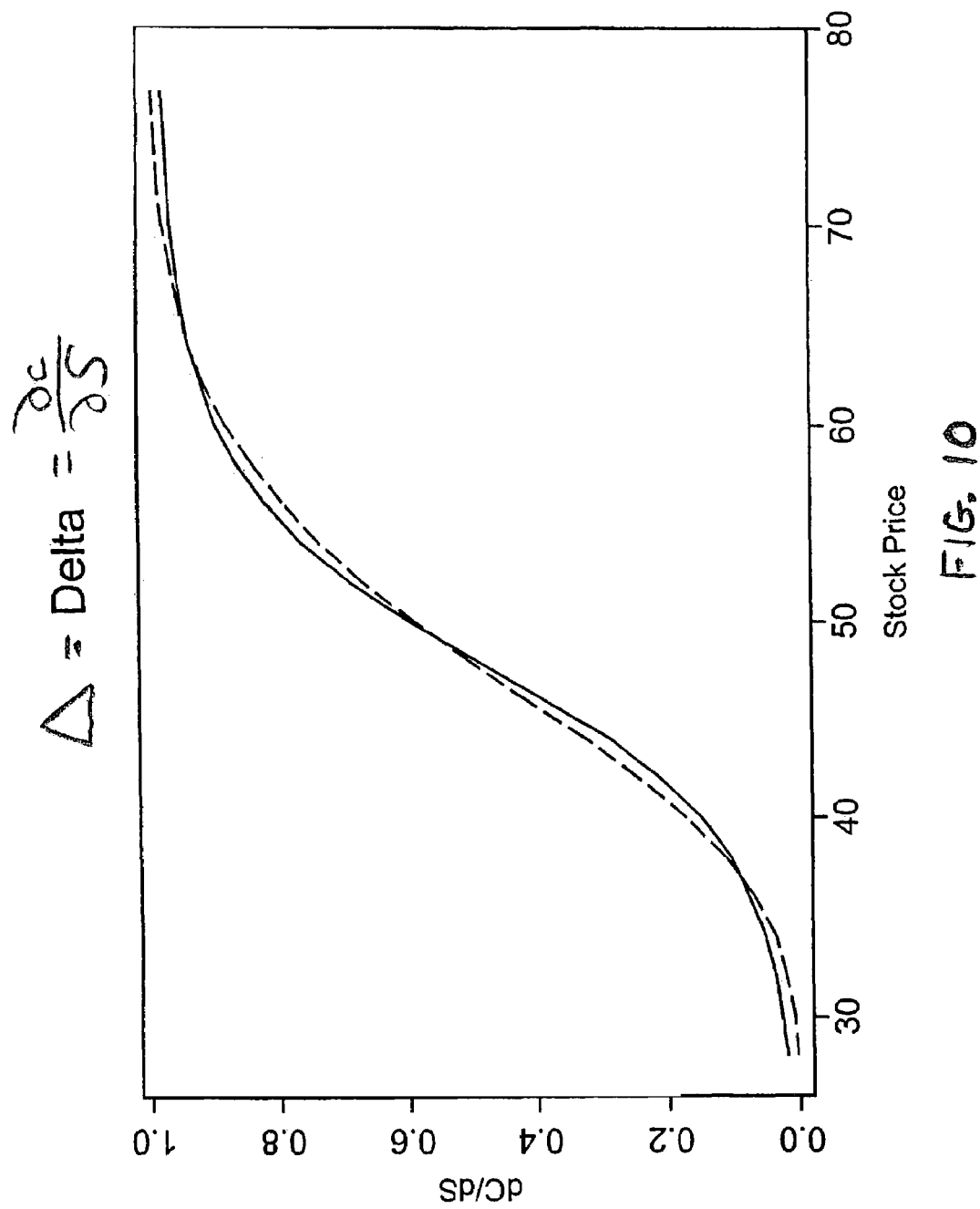
FIGS. 10 through 15 are graphs of the functions known as the "Greeks" (defined below) for a call option having the parameters K=50, r=0.06, and T=0.4 (with S=the stock price), for q=1 (the dashed curves) and q=1.5 (the solid curves) in each of FIGS. 10-14, and for q=1.1, 1.3, 1.4, 1.45, and 1.5 (in order of descent, at S=50) in FIG. 15.
Figure 11:
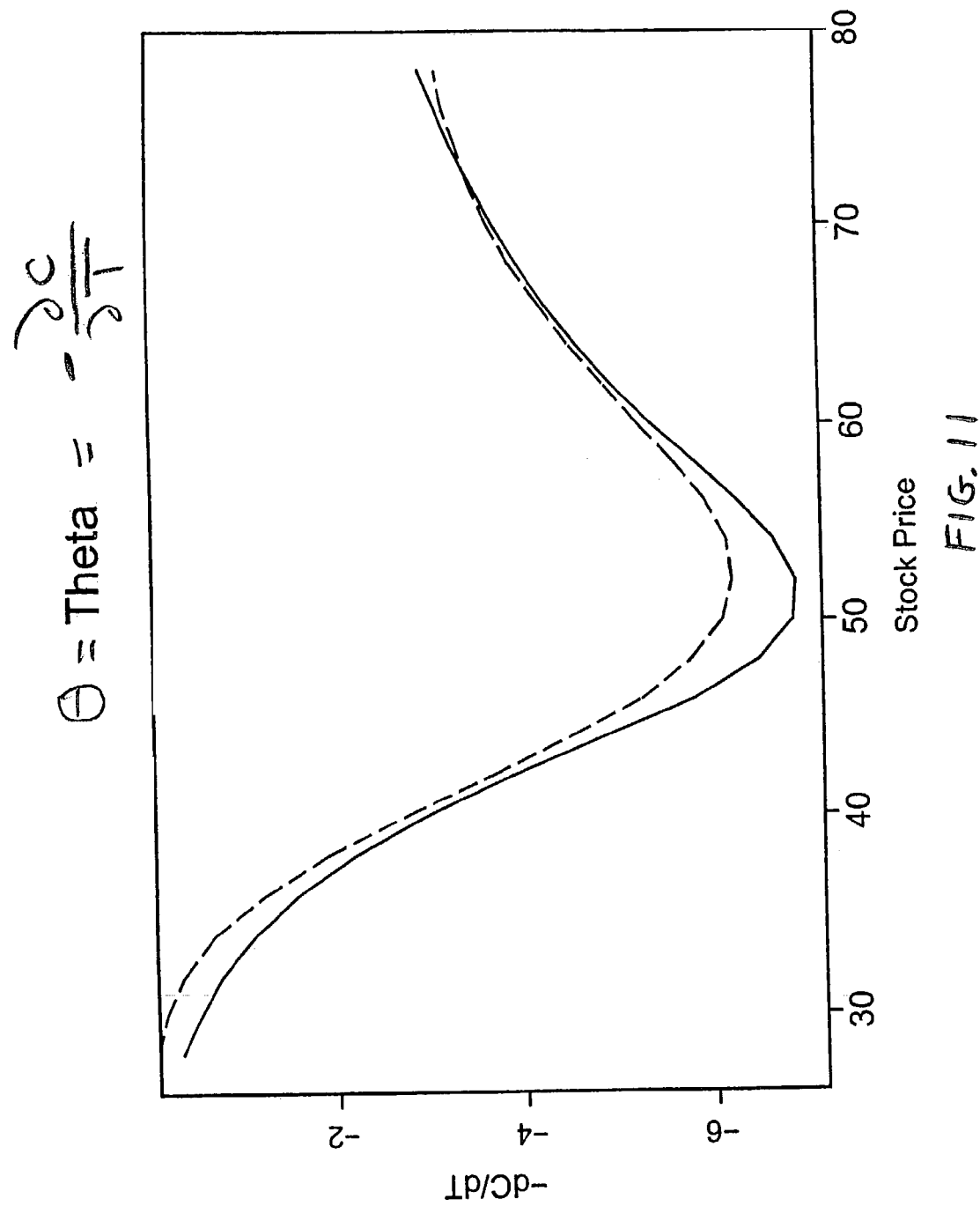
Figure 12:
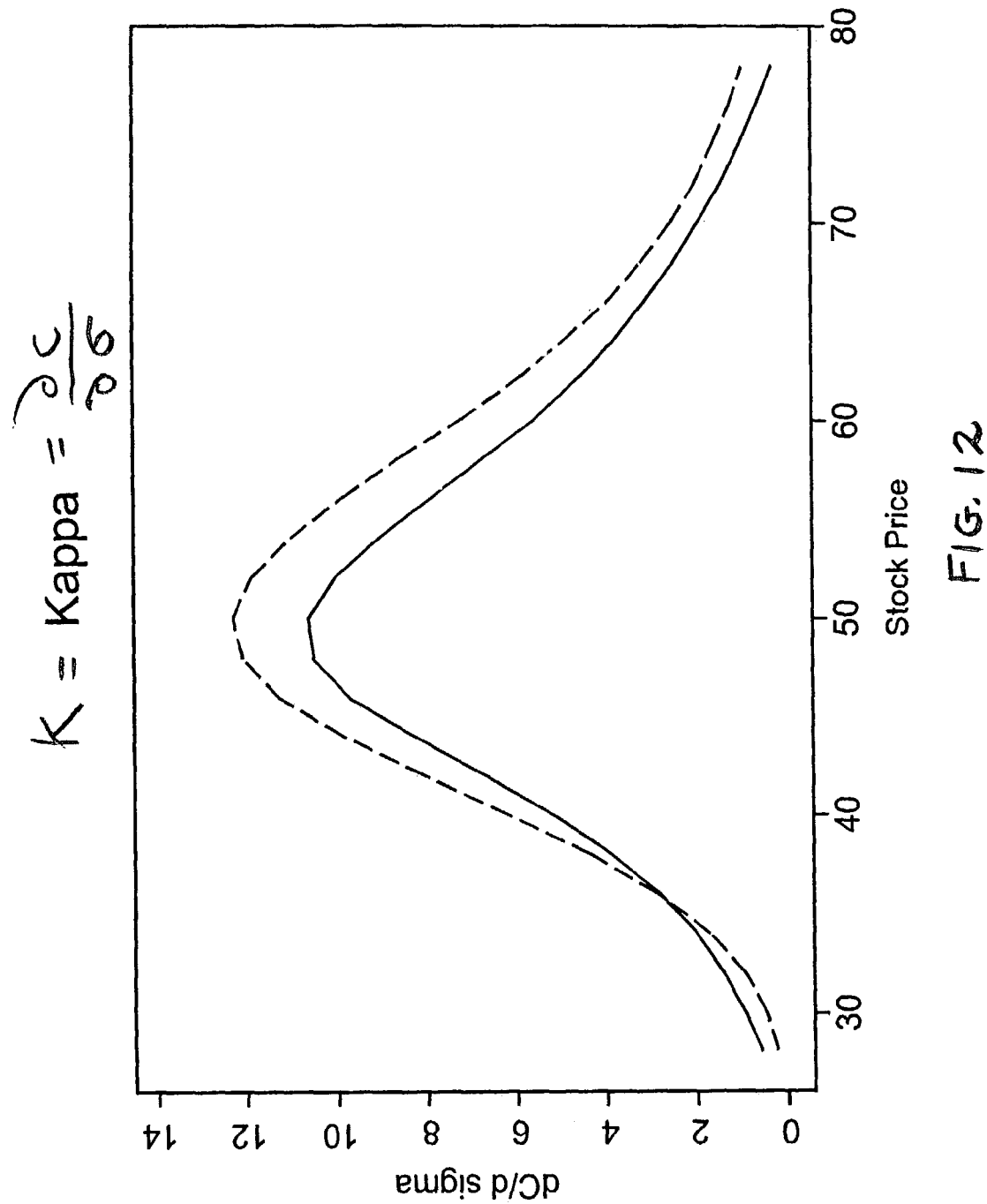
Figure 13:
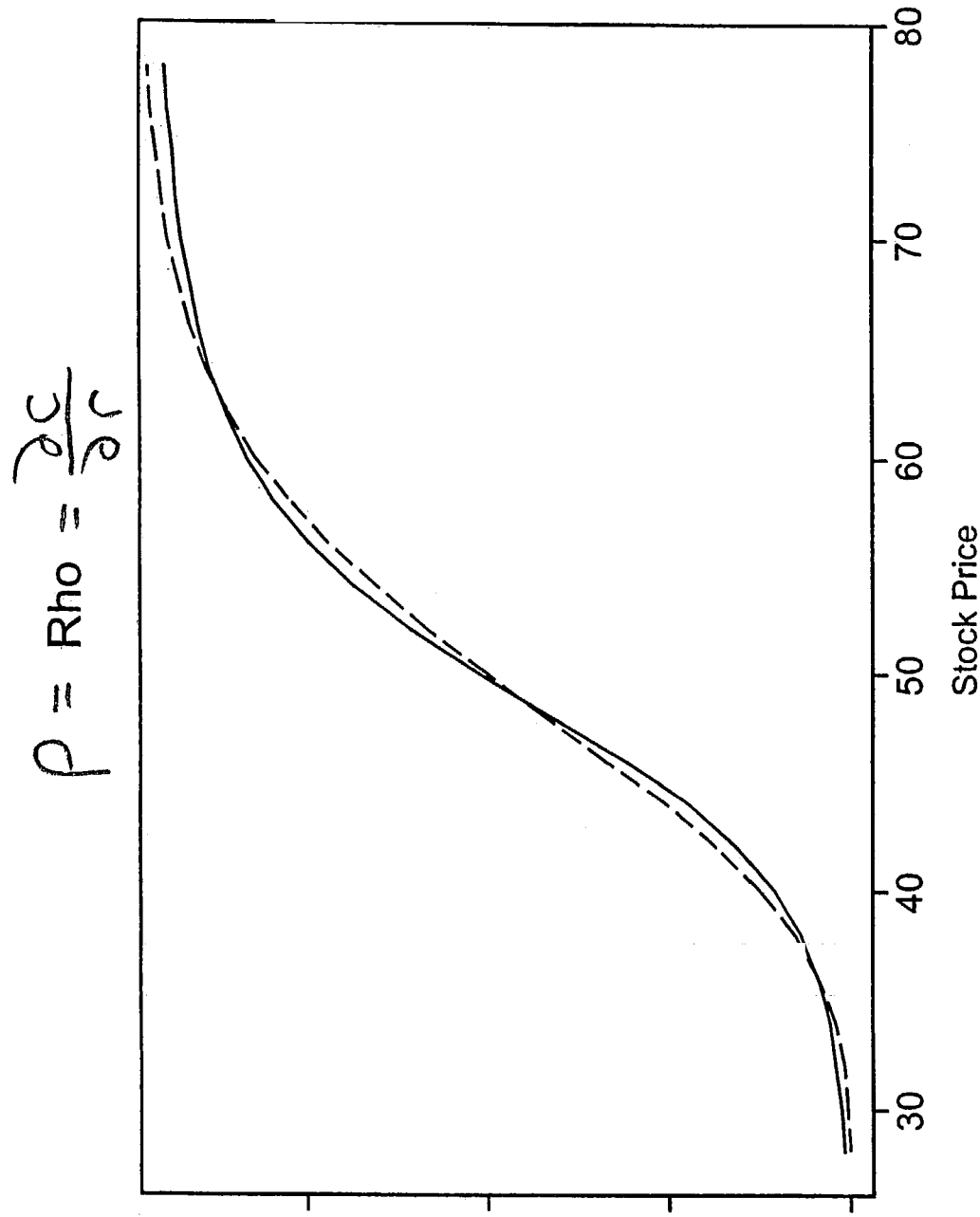
Figure 14:
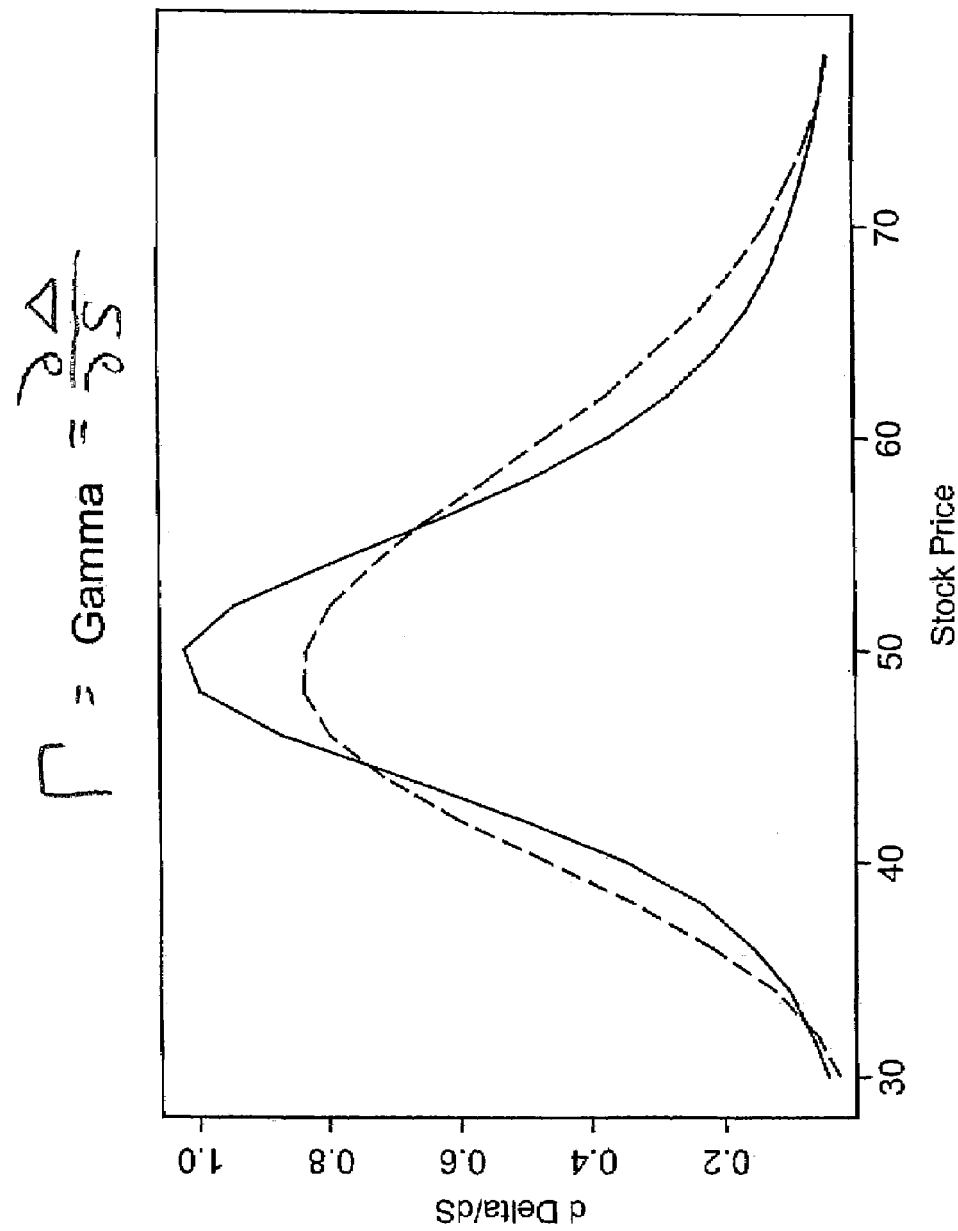
Figure 15:
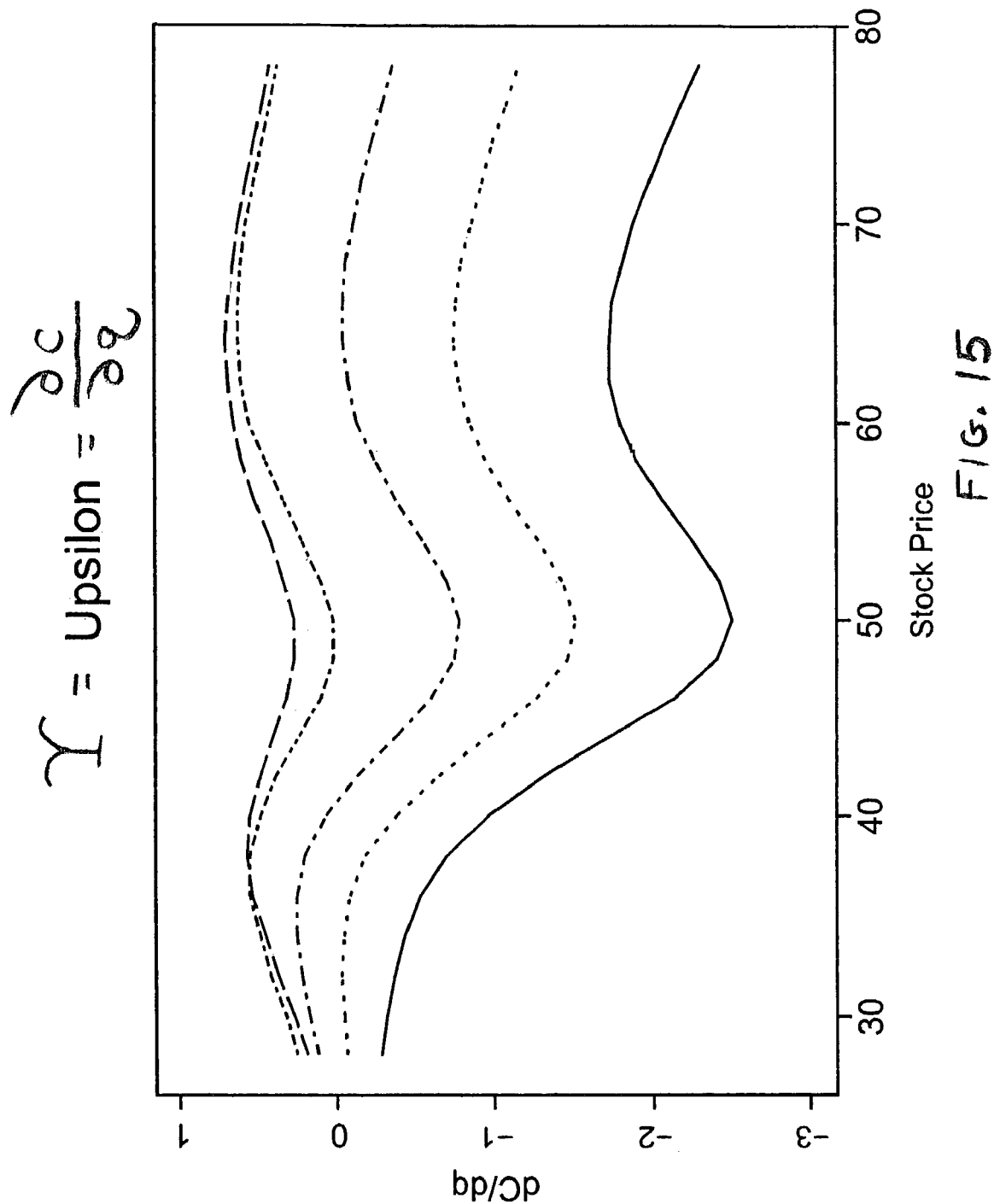

In FIG. 6, the call option price as a function of time to expiration T is plotted, for q=1 and q=1.5. FIG. 7 shows the call price as a function of the parameter q for T=0.4. As q increases, the three curves corresponding to strikes in-the-money, at-the-money, and out-of-the-money all behave similarly. However, the behavior looks different for smaller T, as is seen in FIG. 8 where T=0.05. In FIG. 9, the call option price as a function of σ is shown, for q=1 and q=1.5.

FIGS. 10 through 15 show the so-called Greeks as a function of the current stock price (assuming the parameters indicated on the Figures). The Greeks are partial derivatives defined as $$\Delta = \frac{\partial f}{\partial S} \qquad (122)$$

-continued $$\theta = -\frac{\partial f}{\partial T} \qquad (123)$$

$$\kappa = \frac{\partial f}{\partial \sigma} \qquad (124)$$

$$\rho = \frac{\partial f}{\partial r} \qquad (125)$$

$$\Gamma = \frac{\partial \Delta}{\partial S} = \frac{\partial^2 f}{\partial S^2} \qquad (126)$$

In accordance, we introduce a new Greek designated by the symbol Upsilon, to represent the partial with respect to q, namely $$Upsilon = \frac{\partial f}{\partial q} \qquad (127)$$

A consequence of Ito stochastic calculus is the noise induced drift which appears whenever a transformation of variables occurs. Above, we have described the implications of this noise induced drift when implementing the invention, such as with reference to equations (22), (23), (24). In equation (23), the $\sigma^2/2P_q^{1-q}$ term is a consequence of Ito's Lemma, and corresponds to the noise induce drift.

We next describe an alternative formulation. In this alternative formulation, the starting point is $$dS = \mu S dt + \sigma S d\Omega \qquad (131)$$

as a model for the price of the relevant financial instrument (rather than equation (22), resulting in $$d\ln S = \left(\mu - \frac{\sigma^2}{2} P_q^{1-q}\right) dt + \sigma d\Omega \qquad (132)$$

With Eq(131) as a starting point, the noise induced drift term enters in the equation for ln S. Derivative pricing formulae can be derived in accordance with the invention using either one of Eq(22) and Eq(131) as a starting point. Just as in the standard case (recovered by the invention in the case that q=1), the two models (which are employed in accordance with different embodiments of the invention) yield identical option pricing formulas, because in both cases, μ or $\tilde{\mu}$ disappears under the equivalent martingale measure.

Recall that the formula for S(T) in Eq(62) or Eq(70) contains terms of type $$\int_0^T P(\Omega(s),s)^{1-q} ds \qquad (133)$$

But for each time, s, the distribution of the random variable Ω(s) follows a Tsallis distribution of the form $$P_q(\Omega(s), s) = \frac{1}{Z(s)} (1 - (1-q)\beta(s)\Omega(s)^2)^{\frac{1}{1-q}} \qquad (134)$$

Each such distribution can be mapped onto the distribution of a standardized random variable $\chi_N$ through the variable transformation $$\chi_N = \sqrt{\frac{\beta(s)}{\beta_N}} \Omega(s) \tag{135}$$

with distribution $$P_q(\chi_N) = \frac{1}{Z_N}(1-(1-q)\beta_N \chi_N^2)^{\frac{1}{1-q}} \tag{136}$$

where the standard relation $$P_q(\chi_N) = P_q(\Omega(s), s)\frac{\partial \Omega_s}{\partial \chi_N} \tag{137}$$

holds. It is possible to map the standardized distribution of $\chi_N$ onto the distribution of the variable $\chi(T)$ at the fixed time T via the variable transformation $$\Omega(T) = \sqrt{\frac{\beta_N}{\beta(T)}} \chi_N \tag{138}$$

This result could have also been achieved directly via the variable transformation $$\Omega(s) = \sqrt{\frac{\beta(T)}{\beta(s)}} \Omega(T) \tag{139}$$

Another aspect of the invention is a method for determining the price, f(S), of a derivative whose underlying financial instrument has the price $S=S(t)=S(0)e^{Y(t)}$, where Y(t) evolves across timescale t. and where the underlying financial instrument is a dividend paying instrument (e.g., a dividend paying stock).

Consider the case of a dividend paying stock (or other underlying financial instrument) which pays dividends at the rate w (w is a continuous dividend yield). In time $\Delta t$, the portfolio $\Pi$ (see Eq (28)) gains wealth equal to $\Delta\Pi$ as in Eq (29) plus dividends equal to $$wS\frac{\partial f}{\partial S}\Delta t. \tag{140}$$

The generalized Black-Scholes differential equation thus becomes $$\frac{df}{dt} + (r-w)S\frac{df}{dS} + \frac{1}{2}\frac{d^2f}{dS^2}\sigma^2 S^2 P_q^{1-q} = rf \tag{141}$$

In the risk-neutral martingale representation, this is equivalent to taking the discounted expectation of a stock (or other financial instrument) yielding a return r–w. For a European call (with strike price K and date of expiration T) the price c of such an option is $$c=S(0)e^{-wT}M_q(e_1,e_2,b(\Omega N))-e^{-rT}KN_q(e_1,e_2) \tag{142}$$

using the same notation as in Eqs (99), (100), and (101), but with $e_1$ and $e_2$ replacing $d_1$ and $d_2$, where $e_1$ and $e_2$ are solutions to $$e_{1,2} = \frac{-1}{\alpha T^{\frac{2}{3-q}}(1-q)\sigma\beta(T)} \pm \left(\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\left((r-w)T + \ln\frac{S(0)}{K} - \frac{\sigma^2}{2}\alpha T^{\frac{2}{3-q}}\right)\right)^{\frac{1}{2}}. \tag{143}$$

The price of an option on a future (or other derivative based on a futures contract of an underlying instrument) can be determined in accordance with the invention by recognizing that a futures contract F is equivalent to a financial instrument that pays dividends w exactly equal to the risk-free rate of return r. Therefore, for this case, the price f of such a derivative based on a futures contract of an underlying financial instrument is determined by a solution of $$\frac{df}{dt} + \frac{1}{2}\frac{d^2f}{dF^2}\sigma^2 F^2 P_q^{1-q} = rf. \tag{144}$$

The closed form solution of Eq (144) for the price c of a European call (with strike price K and date of expiration T) on a futures contract F is $$c=e^{-rT}[F(0)M_q(e_1,e_2,b(\Omega_N))-KN_q(e_1,e_2)] \tag{145}$$

with $e_1$ and $e_2$ as in Eq (143) with S(0) replaced by F(0) and w=r. For q=1, this is known as the Black model.

Figure 17:
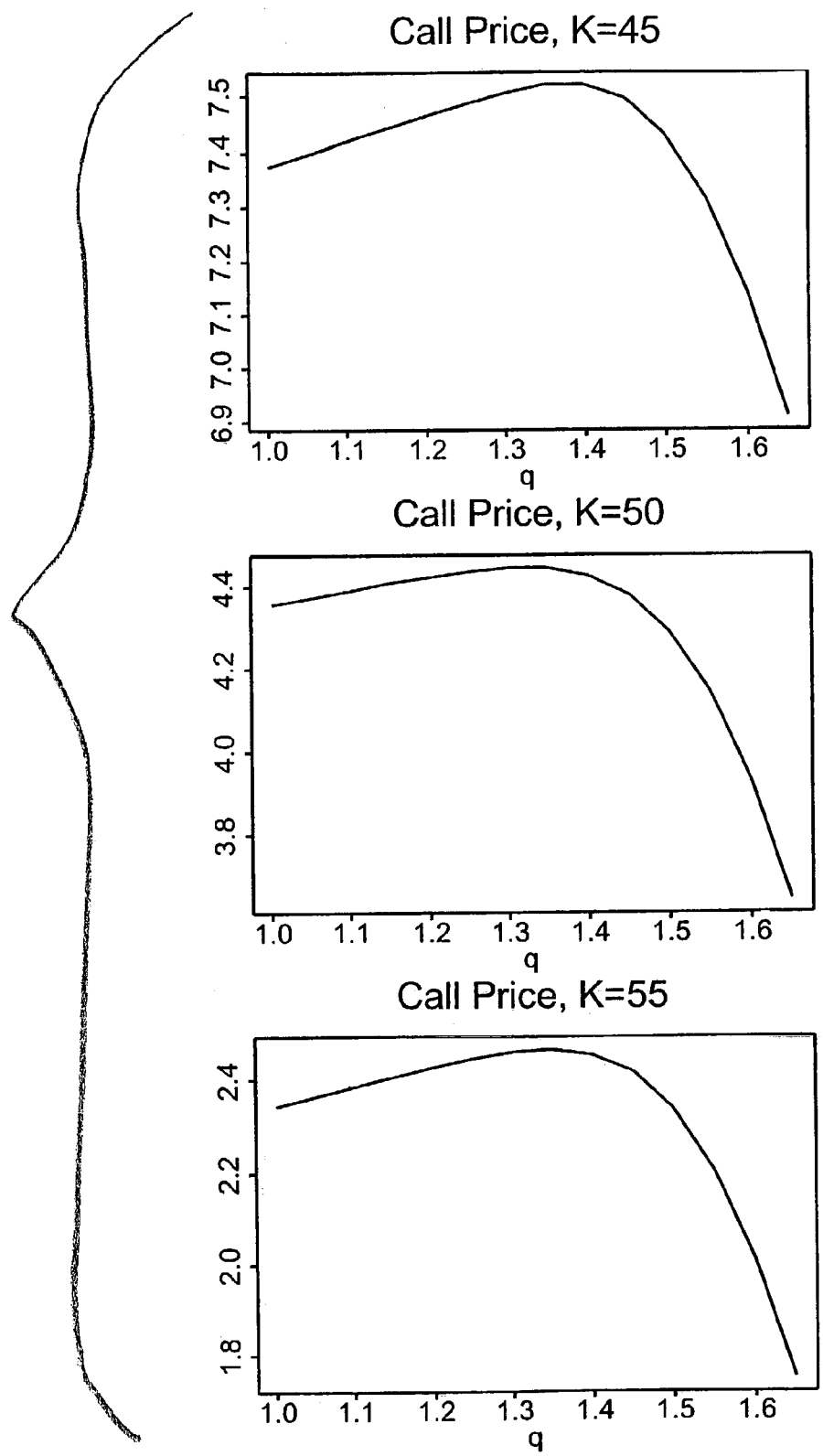
FIG. 17 is an elevational view of a computer readable optical disk on which is stored computer code for implementing any embodiment of the inventive method.
Figure 16:
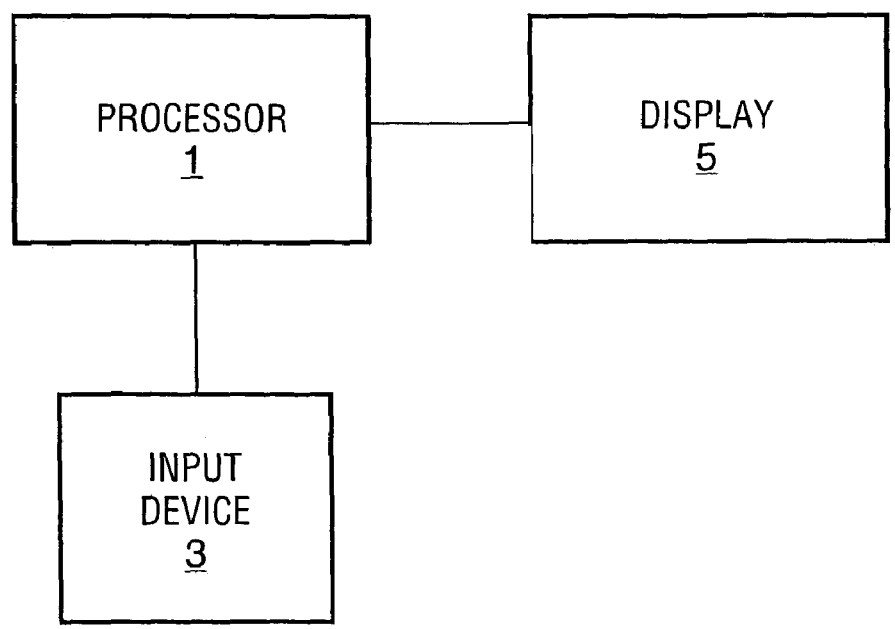
FIG. 16 is block diagram of a computer system for implementing any embodiment of the inventive method.
Figure 17:
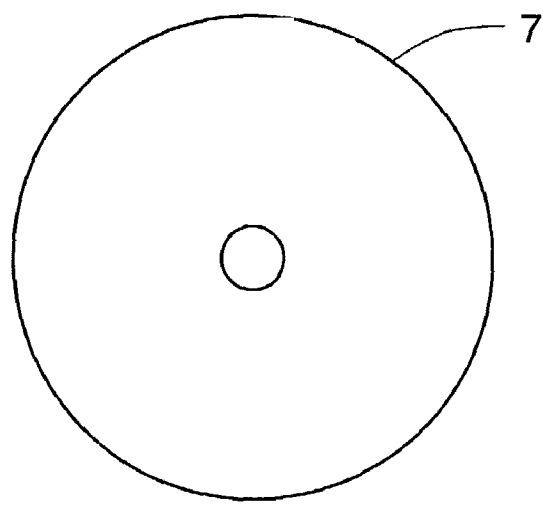

Other aspects of the invention are a system programmed to implement the inventive method and a storage medium which stores code suitable for programming a processor to implement any embodiment of the inventive method. For example, the computer system of FIG. 16 includes processor 1, input device 3 coupled to processor 1, and display device 5 coupled to processor 1. Processor 1 is programmed to implement the inventive method in response to instructions and data entered by user manipulation of input device 3. Computer readable optical disk 7 of FIG. 17 has computer code stored thereon. The computer code is suitable for programming processor 1 to implement an embodiment of the inventive method.

It should be understood that while some embodiments of the present invention are illustrated and described herein, the invention is defined by the claims and is not to be limited to the specific embodiments described and shown. For example, the price of a derivative whose underlying financial instrument has a state-dependent instantaneous rate of return (e.g., where the log returns show some sort of mean reversion) and a state-dependent mean rate of return ($\mu$), can be determined in accordance with the invention.

What is claimed is:

1. A method for determining price, f(S), of a derivative having an underlying financial instrument, said method including the steps of:
   (a) determining a non-Gaussian model of price, S, of the underlying financial instrument, said model assuming statistical feedback,
   where the price S is $S=S(t+\tau)=S(\tau)e^{Y(t)}$, where t denotes a time delay, time interval, or timescale, $\tau$ is an initial time value, $\tau=0$ without loss of generality, Y(t) is a value that evolves across timescale t, and the underlying financial instrument has a return; and
   (b) by operating a computer system, determining as price f, a derivative price value consistent with the model determined in step (a), including by generating data indicative of the derivative price value.

2. The method of claim 1, wherein in accordance with the model, the return of the underlying financial instrument evolves across timescale t according to $dY=\mu dt+\sigma d\Omega$, where $\Omega$ is drive noise, $\mu$ is the mean rate of return of the underlying financial instrument, and $\sigma^2$ is a variance parameter of the logarithmic return of the underlying financial instrument, the drive noise $\Omega$ follows a statistical feedback process $$d\Omega = P_q(\Omega)^{(1-q)/2} d\omega$$

where $\omega$ is zero-mean Gaussian noise, q is an entropic index, q>1, and $P_q$ is a conditional probability that evolves according to $$\frac{\partial}{\partial t} P_q(\Omega, t \mid \Omega', t_0) = \frac{1}{2} \frac{\partial}{\partial \Omega^2} P_q^{2-q}(\Omega, t \mid \Omega', t_0),$$

with $P_q(\Omega) \equiv P_q(\Omega, t \mid \Omega', t_0)$, and where $t_0=0$ without loss of generality.

3. The method of claim 2, wherein the conditional probability $P_q$ evolves according to $$P_q(\Omega, t \mid 0, 0) = \frac{1}{Z(t)} (1 - \beta(t)(1-q)(\Omega)^2)^{\frac{1}{1-q}} Z(t) = ((2-q)(3-q)c(t))^{\frac{1}{3-q}},$$

$$\beta(t) = c^{\frac{1-q}{3-q}} ((2-q)(3-q)(t))^{-2/(3-q)}, \text{ and } c = \beta N^2$$

$$N = \int_{-\infty}^{\infty} (1 - (1-q)\beta\Omega^2)^{\frac{1}{1-q}} d\Omega$$

for any value of $\beta$.

4. The method of claim 3, wherein step (b) includes the step of identifying a solution of $$\frac{df}{dt} + rS\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

5. The method of claim 3, wherein the underlying financial instrument is a dividend-paying instrument having dividend rate w, and wherein step (b) includes the step of identifying a solution of $$\frac{df}{dt} + (r-w)S\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

6. The method of claim 3, wherein the derivative is based on a futures contract F of the underlying financial instrument, r is a risk-free rate of return, the futures contract can be modeled as a financial instrument that pays dividends at a rate w equal to the risk-free rate of return r, and step (b) includes the step of identifying a solution of $$\frac{df}{dt} + \frac{1}{2}\frac{d^2f}{dF^2}\sigma^2 F^2 P_q^{1-q} = rf,$$

under boundary conditions specific to the derivative.

7. The method of claim 3, wherein the derivative is a European option whose payoff is C=h(S(T)) at expiration time T, and step (b) determines the price f to be $$f = \frac{e^{-rT}}{Z(T)} \int_R h\left[S(0)\exp\left(\sigma\Omega(T) + rT - \frac{\sigma^2}{2}\alpha T^{\frac{2}{3-q}}(1-(1-q)\beta(T)\Omega^2(T))\right)\right]$$

$$(1-\beta(T)(1-q)\Omega(T)^2)^{\frac{1}{1-q}} d\Omega_T,$$

where $\alpha=\frac{1}{2}(3-q)[(2-q)(3-q)c]^{(q-1)/(3-q)}$, and r is a risk-free rate of return.

8. The method of claim 3, wherein the underlying financial instrument is a dividend-paying instrument having dividend rate w, the derivative is a European option whose payoff is C=h(S(T)) at expiration time T, and step (b) determines the price f to be $$f = \frac{e^{-rT}}{Z(T)}$$

$$\int_R h\left[S(0)\exp\left(\sigma\Omega(T) + (r-w)T - \frac{\sigma^2}{2}\alpha T^{\frac{2}{3-q}}(1-(1-q)\beta(T)\Omega^2(T))\right)\right]$$

$$(1-\beta(T)(1-q)\Omega(T)^2)^{\frac{1}{1-q}} d\Omega_T,$$

where $\alpha=\frac{1}{2}(3-q)[(2-q)(3-q)c]^{(q-1)/(3-q)}$, and r is a risk-free rate of return.

9. The method of claim 3, wherein the derivative is a European call option giving the right to buy the underlying financial instrument at a strike price K at expiration time T, and step (b) determines the price f to be $f=J_1-J_2$, where $$J_1 = \frac{S(0)}{Z(T)}\int_{s_1}^{s_2} \exp\left(\sigma\Omega - \frac{\sigma^2}{2}\alpha T^{\frac{2}{3-q}} + (1-q)\alpha T^{\frac{2}{3-q}}\beta(T)\frac{\sigma^2}{2}\Omega^2\right)(1-(1-q)\beta(T)\Omega^2)^{\frac{1}{1-q}}d\Omega,$$

$$J_2 = \frac{e^{-rT}K}{Z(T)}\int_{s_1}^{s_2}(1-(1-q)\beta(T)\Omega^2)^{\frac{1}{1-q}}d\Omega,$$

$$\alpha = \frac{1}{2}(3-q)[(2-q)(3-q)c]^{(q-1)/3-q)}, \text{ and } s_{1,2} = \frac{-1}{\alpha T^{\frac{2}{3-q}}(1-q)\sigma\beta(T)} \pm$$

$$\left(\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\left(rT + \ln\frac{S(0)}{K} - \frac{\sigma^2}{2}\alpha T^{\frac{2}{3-q}}\right)\right)^{\frac{1}{2}}.$$

10. The method of claim 3, wherein the derivative is a European call option giving the right to buy the underlying financial instrument at a strike price K at expiration time T, and step (b) determines the price f to be $$f = S(0)M_q(d_1, d_2, b(\Omega_N)) - e^{-rT}KN_q(d_1, d_2)$$

where $$N_q(d_1, d_2) = \frac{1}{Z_N}\int_{d_1}^{d_2}(1-(1-q)\beta_N\Omega_N^2)^{\frac{1}{1-q}}d\Omega_N,$$

$$M_q(d_1, d_2, b(\Omega_N)) = \frac{1}{Z_N}\int_{d_1}^{d_2}\exp(b(\Omega_N))(1-(1-q)\beta_N\Omega_N^2)^{\frac{1}{1-q}}d\Omega_N,$$

$$b(\Omega_N) = \sigma\sqrt{\frac{\beta_N}{\beta(T)}}\,\Omega_N - \frac{\sigma^2}{2}\alpha T^{\frac{2}{3-q}}(1-(1-q)\beta_N\Omega_N^2),\, \Omega_N = \Omega(T)\sqrt{\frac{\beta(T)}{\beta_N}}\,,$$

$$\alpha = \frac{1}{2}(3-q)((2-q)(3-q)c)^{\frac{q-1}{3-q}},\, Z_N = \int_{-\infty}^{\infty}(1-(1-q)\beta_N\Omega_N^2)^{\frac{1}{1-q}}d\Omega_N,$$

$$d_{1,2} = \frac{s_{1,2}}{\sigma\sqrt{\beta_N/\beta(T)}},\text{ and } s_{1,2} = \frac{-1}{\alpha T^{\frac{2}{3-q}}(1-q)\sigma\beta(T)} \pm$$

$$\left(\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\left(rT + \ln\frac{S(0)}{K} - \frac{\sigma^2}{2}\alpha T^{\frac{2}{3-q}}\right)\right)^{\frac{1}{2}},$$

where r is a risk-free rate of return.

11. The method of claim 2, wherein step (b) includes the step of identifying a solution of $$\frac{df}{dt} + rS\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

12. The method of claim 2, wherein the underlying financial instrument is a dividend-paying instrument having dividend rate w, and wherein step (b) includes the step of identifying a solution of $$\frac{df}{dt} + (r-w)S\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

13. The method of claim 2, wherein the derivative is based on a futures contract F of the underlying financial instrument, r is a risk-free rate of return, the futures contract can be modeled as a financial instrument that pays dividends at a rate w equal to the risk-free rate of return r, and step (b) includes the step of identifying a solution of $$\frac{df}{dt} + \frac{1}{2}\frac{d^2f}{dF^2}\sigma^2 F^2 P_q^{1-q} = rf,$$

under boundary conditions specific to the derivative.

14. The method of claim 1, wherein the underlying financial instrument is a stock and the derivative is an option.

15. A method for determining price, f(S), of a derivative having an underlying financial instrument, said method including the steps of:
  (a) determining price, S, of the underlying financial instrument at time t=T to be $$S(T) = S(0)\exp\left(\Omega(T) + rT - \frac{\sigma^2}{2}\alpha T^{\frac{2}{3-q}}(1-(1-q)\beta(T)\Omega^2(T))\right),$$

where
  $S = S(t+\tau) = S(\tau)e^{Y(t)}$, where t denotes a time delay, time interval, or timescale, τ is an initial time value, τ=0 without loss of generality, Y(t) is a value that evolves across timescale t, and the underlying financial instrument has a return, $$\alpha = \frac{1}{2}(3-q)((2-q)(3-q)c)^{\frac{q-1}{3-q}},$$

q is an entropic index, q>1, $\Omega$ is drive noise, $\sigma^2$ is a variance parameter of the logarithmic return of the underlying financial instrument, $$\beta(t) = c^{\frac{1-q}{3-q}}((2-q)(3-q)t)^{-2/(3-q)}, \text{ and } c = \beta N^2$$

with $$N = \int_{-\infty}^{\infty} (1 - (1-q)\beta\Omega^2)^{\frac{1}{1-q}} d\Omega$$

for any value of $\beta$,
the drive noise $\Omega$ follows a statistical feedback process $$d\Omega = P_q(\Omega)^{(1-q)/2} d\omega$$

where $\omega$ is zero-mean Gaussian noise, $P_q(\Omega) \equiv P_q(\Omega,t|\Omega',t_0)$, $t_0=0$ without loss of generality, and $P_q$ is a conditional probability that evolves according to $$P_q(\Omega, t|0,0) = \frac{1}{Z(t)}(1 - \beta(t)(1-q)(\Omega)^2)^{\frac{1}{1-q}} \text{ where } Z(t) = ((2-q)(3-q)ct)^{\frac{1}{3-q}},$$

and
(b) by operating a computer system, determining the price f from the price S determined in step (a) and from boundary conditions specific to the derivative, including by generating data indicative of said price f.

16. A method for determining price, f(S), of a derivative having an underlying financial instrument, said method including the steps of:
(a) determining price, S, of the underlying financial instrument at time t=T to be $$S(T) = S(0)\exp\left(\int_0^T \sigma P_q^{\frac{1-q}{2}} dz_s + \int_0^T \left(r - \frac{\sigma^2}{2}P_q^{1-q}\right)ds\right),$$

where
S=S(t+τ)=S(τ)e$^{Y(t)}$, where t denotes a time delay, time interval, or timescale, τ is an initial time value, τ=0 without loss of generality, Y(t) is a value that evolves across timescale t, and the underlying financial instrument has a return;
q is an entropic index, q>1, z is drive noise, $\sigma^2$ is a variance parameter of the logarithmic return of the underlying financial instrument, r is a risk-free rate of return, $P_q$ is a conditional probability that satisfies $$d\frac{\left(\ln S - rt + \frac{\sigma^2}{2}P_q^{1-q}(\Omega)\right)}{\sigma} = d\Omega,$$

$\Omega$ is drive noise, and the drive noise z satisfies $$dz = \left(\frac{\mu - r + \frac{\sigma^2 P_q^{1-q}}{2}}{\sigma P_q^{\frac{1-q}{2}}}\right)dt + d\omega,$$

where $\omega$ is zero-mean Gaussian noise, and $\mu$ is the mean rate of return; and
(b) by operating a computer system, determining the price f from the price S determined in step (a) and from boundary conditions specific to the derivative, including by generating data indicative of said price f.

17. A computer system, comprising:
a processor programmed to generate data indicative of price, f(S), of a derivative having an underlying financial instrument whose price is S=S(t+τ)=S(τ)e$^{Y(t)}$, where t denotes a time delay, time interval, or timescale, T is an initial time value, τ=0 without loss of generality, Y(t) is a value that evolves across timescale t, and the underlying financial instrument has a return, including by implementing a non-Gaussian model of the price S, said model assuming statistical feedback, and determining as the price, f, a value consistent with the model; and
a display device coupled to the processor for displaying a result of the determination of the price, f(S), of the derivative.

18. The system of claim 17, wherein in accordance with the model, the return of the underlying financial instrument evolves across timescale t according to dY=µdt+σdΩ, where $\Omega$ is drive noise, µ is the mean rate of return of the underlying financial instrument, and $\sigma^2$ is a variance parameter of the logarithmic return of the underlying financial instrument, the drive noise $\Omega$ follows a statistical feedback process $$d\Omega = P_q(\Omega)^{(1-q)/2} d\omega$$

where $\omega$ is zero-mean Gaussian noise, q is an entropic index, q>1, $P_q(\Omega) \equiv P_q(\Omega,t|\Omega',t_0)$, $t_0=0$ without loss of generality, and $P_q$ is a conditional probability that evolves according to $$\frac{\partial}{\partial t}P_q(\Omega, t|\Omega', 0) = \frac{1}{2}\frac{\partial}{\partial \Omega^2}P_q^{2-q}(\Omega, t|\Omega', 0).$$

19. The system of claim 18, wherein the processor is programmed to implement the model such that the conditional probability $P_q$ evolves according to $$P_q(\Omega, t|0,0) = \frac{1}{Z(t)}(1 - \beta(t)(1-q)(\Omega)^2)^{\frac{1}{1-q}}$$

$$Z(t) = ((2-q)(3-q)c(t))^{\frac{1}{3-q}},$$

$$\beta(t) = c^{\frac{1-q}{3-q}}((2-q)(3-q)(t))^{-2/(3-q)},$$

$$c = \beta N^2 \text{ with } N = \int_{-\infty}^{\infty} (1 - (1-q)\beta\Omega^2)^{\frac{1}{1-q}} d\Omega$$

for any value of β.

20. The system of claim 19, wherein the processor is programmed to identify, as the price f, a solution of $$\frac{df}{dt} + rS\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

21. The system of claim 19, wherein the underlying financial instrument is a dividend paying instrument having dividend rate w, and the processor is programmed to identify, as the price f, a solution of $$\frac{df}{dt} + (r-w)S\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

22. The system of claim 19, wherein the derivative is based on a futures contract F of the underlying financial instrument, r is a risk-free rate of return, the futures contract can be modeled as a financial instrument that pays dividends at a rate w equal to the risk-free rate of return r, and the processor is programmed to identify, as the price f, a solution of $$\frac{df}{dt} + \frac{1}{2}\frac{d^2f}{dF^2}\sigma^2 F^2 P_q^{1-q} = rf,$$

under boundary conditions specific to the derivative.

23. The system of claim 19, wherein the derivative is a European option whose payoff is C=h(S(T)) at expiration time T, and the processor is programmed to determine the price f to be $$f = \frac{e^{-rT}}{Z(T)}\int_R h\left[S(0)\exp\left(\sigma\Omega(T) + rT - \frac{\sigma^2}{2}\alpha T^{\frac{2}{3-q}}(1-(1-q)\beta(T)\Omega^2(T))\right)\right]$$
$$(1 - \beta(T)(1-q)\Omega(T)^2)^{\frac{1}{1-q}} d\Omega_T,$$

where $\alpha = \frac{1}{2}(3-q)[(2-q)(3-q)c]^{(q-1)/(3-q)}$.

24. The system of claim 19, wherein the underlying financial instrument is a dividend-paying instrument having dividend rate w, the derivative is a European option whose payoff is C=h(S(T)) at expiration time T, and the processor is programmed to determine the price f to be $$f = \frac{e^{-rT}}{Z(T)}$$
$$\int_R h\left[S(0)\exp\left(\sigma\Omega(T) + (r-w)T - \frac{\sigma^2}{2}\alpha T^{\frac{2}{3-q}}(1-(1-q)\beta(T)\Omega^2(T))\right)\right]$$

-continued
$$(1 - \beta(T)(1-q)\Omega(T)^2)^{\frac{1}{1-q}} d\Omega_T,$$

where $\alpha = \frac{1}{2}(3-q)[(2-q)(3-q)c]^{(q-1)/(3-q)}$.

25. The system of claim 19, wherein the derivative is a call option giving the right to buy the underlying financial instrument at a strike price K at expiration time T, and the processor is programmed to determine the price f to be f=J₁-J₂, where $$J_1 = \frac{S(0)}{Z(T)}\int_{s_1}^{s_2} \exp\left(\sigma\Omega - \frac{\sigma^2}{2}\alpha T^{\frac{2}{3-q}} + (1-q)\alpha T^{\frac{2}{3-q}}\beta(T)\frac{\sigma^2}{2}\Omega^2\right)$$
$$(1 - (1-q)\beta(T)\Omega^2)^{\frac{1}{1-q}} d\Omega,$$

$$J_2 = \frac{e^{-rT}K}{Z(T)}\int_{s_1}^{s_2} (1 - (1-q)\beta(T)\Omega^2)^{\frac{1}{1-q}} d\Omega,$$

$$\alpha = 1/2(3-q)[(2-q)(3-q)c]^{(q-1)/(3-q)}, \text{ and}$$

$$s_{1,2} = \frac{-1}{\alpha T^{\frac{2}{3-q}}(1-q)\sigma\beta(T)} \pm$$

$$\left(\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\right.$$

$$\left.\left(rT + \ln\frac{S(0)}{K} - \frac{\sigma^2}{2}\alpha T^{\frac{2}{3-q}}\right)\right)^{\frac{1}{2}}.$$

26. The system of claim 19, wherein the derivative is a call option giving the right to buy the underlying financial instrument at a strike price K at time T, and the processor is programmed to determine the price f to be $$f = S(0)M_q(d_1, d_2, b(\Omega_N)) - e^{-rT}KN_q(d_1, d_2)$$

where $$N_q(d_1, d_2) = \frac{1}{Z_N}\int_{d_1}^{d_2} (1 - (1-q)\beta_N\Omega_N^2)^{\frac{1}{1-q}} d\Omega_N,$$

$$M_q(d_1, d_2, b(\Omega_N)) = \frac{1}{Z_N}\int_{d_1}^{d_2} \exp(b(\Omega_N))(1 - (1-q)\beta_N\Omega_N^2)^{\frac{1}{1-q}} d\Omega_N,$$

$$b(\Omega_N) = \sigma\sqrt{\frac{\beta_N}{\beta(T)}}\Omega_N - \frac{\sigma^2}{2}\alpha T^{\frac{2}{3-q}}(1-(1-q)\beta_N\Omega_N^2),$$

$$\Omega_N = \Omega(T)\sqrt{\frac{\beta(T)}{\beta_N}},$$

$$\alpha = \frac{1}{2}(3-q)((2-q)(3-q)c)^{\frac{q-1}{3-q}},$$

$$Z_N = \int_{-\infty}^{\infty} (1-(1-q)\beta_N\Omega_N^2)^{\frac{1}{1-q}} d\Omega_N,$$

$$d_{1,2} = \frac{s_{1,2}}{\sigma\sqrt{\beta_N/\beta(T)}}, \text{ and}$$

$$s_{1,2} = \frac{-1}{\alpha T^{\frac{2}{3-q}}(1-q)\sigma\beta(T)} \pm$$

-continued $$\left\{\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\right.$$

$$\left. \left(rT + \ln\frac{S(0)}{K} - \frac{\sigma^2}{2}\alpha T^{\frac{2}{3-q}}\right)\right\}^{\frac{1}{2}},$$

where r is a risk-free rate of return.

27. The system of claim 18, wherein the processor is programmed to identify, as the price f, a solution of $$\frac{df}{dt} + rS\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

28. The system of claim 18, wherein the underlying financial instrument is a dividend paying instrument having dividend rate w, and the processor is programmed to identify, as the price f, a solution of $$\frac{df}{dt} + (r-w)S\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

29. The system of claim 18, wherein the derivative is based on a futures contract F of the underlying financial instrument, r is a risk-free rate of return, the futures contract can be modeled as a financial instrument that pays dividends at a rate w equal to the risk-free rate of return r, and the processor is programmed to identify, as the price f, a solution of $$\frac{df}{dt} + \frac{1}{2}\frac{d^2f}{dF^2}\sigma^2 F^2 P_q^{1-q} = rf,$$

under boundary conditions specific to the derivative.

30. A computer system, comprising:
a processor programmed to generate data indicative of price, f(S), of a derivative having an underlying financial instrument whose price is $S=S(t+\tau)=S(\tau)e^{Y(t)}$, where t denotes a time delay, time interval, or timescale, $\tau$ is an initial time value, $\tau=0$ without loss of generality, Y(t) is a value that evolves across timescale t, and the underlying financial instrument has a return, including by determining the price S at time t=T to be $$S(T) = S(0)\exp\left(\Omega(T) + rT - \frac{\sigma^2}{2}\alpha T^{\frac{2}{3-q}}(1-(1-q)\beta(T)\Omega^2(T))\right),$$

where $$\alpha = \frac{1}{2}(3-q)((2-q)(3-q)c)^{\frac{q-1}{3-q}},$$

q is an entropic index, q>1, $\Omega$ is drive noise, $\sigma^2$ is a variance parameter of the logarithmic return of the underlying financial instrument, r is a risk-free rate of return, $$\beta(t) = c^{\frac{1-q}{3-q}}((2-q)(3-q)t)^{-2/(3-q)}$$

and $$c = \beta N^2 \text{ with } N = \int_{-\infty}^{\infty}(1-(1-q)\beta\Omega^2)^{\frac{1}{1-q}}d\Omega$$

for any value of $\beta$,
the drive noise $\Omega$ follows a statistical feedback process $$d\Omega = P_q(\Omega)^{(1-q)/2}d\omega$$

where $\omega$ is zero-mean Gaussian noise, $P_q(\Omega) \equiv P_q(\Omega,t|\Omega',t_0)$, $t_0=0$ without loss of generality, and $P_q$ is a conditional probability that evolves according to $$P_q(\Omega, t | 0, 0) = \frac{1}{Z(t)}(1-\beta(t)(1-q)(\Omega)^2)^{\frac{1}{1-q}},$$

where $$Z(t) = ((2-q)(3-q)ct)^{\frac{1}{3-q}},$$

and determining the price f from said price S at time t=T; and
a display device coupled to the processor for displaying a result of the determination of the price f.

31. A computer system, comprising:
a processor programmed to generate data indicative of price, f(S), of a derivative having an underlying financial instrument whose price is $S=S(t+\tau)=S(\tau)e^{Y(t)}$, where t denotes a time delay, time interval, or timescale, $\tau$ is an initial time value, $\tau=0$ without loss of generality, Y(t) is a value that evolves across timescale t, and the underlying financial instrument has a return, including by determining the price S at time t=T to be $$S(T) = S(0)\exp\left(\int_0^T \sigma P_q^{\frac{1-q}{2}}dz_s + \int_0^T \left(r - \frac{\sigma}{2}P_q^{1-q}\right)ds\right),$$

where
q is an entropic index, q>1, z is drive noise, r is a risk-free rate of return, $\sigma^2$ is a variance parameter of the logarithmic return of the underlying financial instrument, and $P_q$ is a conditional probability that satisfies $$d\frac{\left(\ln S - rt + \frac{\sigma^2}{2}P_q^1(\Omega)\right)}{\sigma} = d\Omega$$

$\Omega$ is drive noise, and the drive noise z satisfies $$dz = \left(\frac{\mu - r + \frac{\sigma^2 P_q^{1-q}}{2}}{\sigma P_q^{\frac{1-q}{2}}}\right) dt + d\omega,$$

where ω is zero-mean Gaussian noise, and μ is the mean rate of return, and determining the price f from said price S at time t=T; and a display device coupled to the processor for displaying a result of the determination of the price f.

32. A computer readable medium which is a tangible object and which stores code for programming a processor to generate data indicative of the price, f(S), of a derivative having an underlying financial instrument whose price is $S=S(t+\tau)=S(\tau)e^{Y(t)}$, where t denotes a time delay, time interval, or timescale, T is an initial time value, τ=0 without loss of generality, Y(t) is a value that evolves across timescale t, and the underlying financial instrument has a return, including by implementing a non-Gaussian model of the price, S, said model assuming statistical feedback, and determining, as the price f, a value consistent with the model.

33. The medium of claim 32, wherein in accordance with the model, the return of the underlying financial instrument evolves across timescale t according to $dY=\mu dt + \sigma d\Omega$, where Ω is drive noise, μ is the mean rate of return of the underlying financial instrument, and $\sigma^2$ is a variance parameter of the logarithmic return of the underlying financial instrument, the drive noise Ω follows a statistical feedback process $$d\Omega = P_q(\Omega)^{(1-q)/2} d\omega$$

where ω is zero-mean Gaussian noise, q is an entropic index, q>1, $P_q(\Omega) \equiv P_q(\Omega, t|\Omega', t_0)$, $t_0=0$ without loss of generality, and $P_q$ is a conditional probability that evolves according to $$\frac{\partial}{\partial t} P_q(\Omega, t | \Omega', 0) = \frac{1}{2} \frac{\partial}{\partial \Omega^2} P_q^{2-q}(\Omega, t | \Omega', 0).$$

34. The medium of claim 33, wherein the code includes code for programming the processor to implement the model such that the conditional probability $P_q$ evolves according to $$P_q(\Omega, t | 0, 0) =$$

$$\frac{1}{Z(t)} (1 - \beta(t)(1-q)(\Omega)^2)^{\frac{1}{1-q}} \text{ where } Z(t) = ((2-q)(3-q)c(t))^{\frac{1}{3-q}},$$

$$\beta(t) = c^{\frac{1-q}{3-q}} ((2-q)(3-q)(t))^{-2/(3-q)},$$

$$c = \beta N^2 \text{ with } N = \int_{-\infty}^{\infty} (1 - (1-q)\beta \Omega^2)^{\frac{1}{1-q}} d\Omega$$

for any value of β.

35. The medium of claim 34, wherein the code includes code for programming the processor to identify, as the price f, a solution of $$\frac{df}{dt} + rS \frac{df}{dS} + \frac{1}{2} \frac{d^2 f}{dS^2} \sigma^2 S^2 P_q^{1-q} = rf,$$

under boundary conditions specific to the derivative, where r is a risk-free rate of return.

36. The medium of claim 34, wherein r is a risk-free rate of return, the underlying financial instrument is a dividend paying instrument having dividend rate w, and the code includes code for programming the processor to identify, as the price f, a solution of $$\frac{df}{dt} + (r-w)S \frac{df}{dS} + \frac{1}{2} \frac{d^2 f}{dS^2} \sigma^2 S^2 P_q^{1-q} = rf,$$

under boundary conditions specific to the derivative.

37. The medium of claim 34, wherein the derivative is based on a futures contract F of the underlying financial instrument, r is a risk-free rate of return, the futures contract can be modeled as a financial instrument that pays dividends at a rate w equal to the risk-free rate of return r, and the code includes code for programming the processor to identify, as the price f, a solution of $$\frac{df}{dt} + \frac{1}{2} \frac{d^2 f}{dF^2} \sigma^2 F^2 P_q^{1-q} = rf,$$

under boundary conditions specific to the derivative.

38. The medium of claim 34, wherein the derivative is a European option whose payoff is C=h(S(T)) at expiration time T, r is a risk-free rate of return, and the code includes code for programming the processor to determine the price f to be $$f = \frac{e^{-rT}}{Z(T)} \int_R h \left[ S(0) \exp\left( \sigma \Omega(T) + rT - \frac{\sigma^2}{2} \alpha T^{\frac{2}{3-q}} (1 - (1-q)\beta(T)\Omega^2(T)) \right) \right]$$

$$(1 - \beta(T)(1-q)\Omega(T)^2)^{\frac{1}{1-q}} d\Omega_T,$$

$$\text{where } \alpha = \frac{1}{2}(3-q)[(2-q)(3-q)c]^{(q-1)/(3-q)}.$$

39. The medium of claim 34, wherein the underlying financial instrument is a dividend-paying instrument having dividend rate w, the derivative is a European option whose payoff is C=h(S(T)) at expiration time T, r is a risk-free rate of return, and the code includes code for programming the processor to determine the price f to be $$f = \frac{e^{-rT}}{Z(T)}$$

$$\int_R h \left[ S(0) \exp\left( \sigma \Omega(T) + (r-w)T - \frac{\sigma^2}{2} \alpha T^{\frac{2}{3-q}} (1 - (1-q)\beta(T)\Omega^2(T)) \right) \right]$$

$$(1 - \beta(T)(1-q)\Omega(T)^2)^{\frac{1}{1-q}} d\Omega_T,$$

$$\text{where } \alpha = \frac{1}{2}(3-q)[(2-q)(3-q)c]^{(q-1)/(3-q)}.$$

where $\alpha = \frac{1}{2}(3-q)[(2-q)(3-q)c]^{(q-1)/(3-q)}$.

40. The medium of claim 34, wherein the derivative is a call option giving the right to buy the underlying financial instrument at a strike price K at expiration time T, and the code includes code for programming the processor to determine the price f to be $f=J_1-J_2$, where $$J_1 = \frac{S(0)}{Z(T)} \int_{s_1}^{s_2} \exp\left(\sigma\Omega - \frac{\sigma^2}{2}\alpha T^{\frac{2}{3-q}} + (1-q)\alpha T^{\frac{2}{3-q}}\beta(T)\frac{\sigma^2}{2}\Omega^2\right)$$
$$(1-(1-q)\beta(T)\Omega^2)^{\frac{1}{1-q}} d\Omega,$$

$$J_2 = \frac{e^{-rT}K}{Z(T)} \int_{s_1}^{s_2} (1-(1-q)\beta(T)\Omega^2)^{\frac{1}{1-q}} d\Omega,$$

$$\alpha = \frac{1}{2}(3-q)[(2-q)(3-q)c]^{(q-1)/(3-q)}, \text{ and}$$

$$s_{1,2} = \frac{-1}{\alpha T^{\frac{2}{3-q}}(1-q)\sigma\beta(T)} \pm \left(\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\left(rT + \ln\frac{S(0)}{K} - \frac{\sigma^2}{2}\alpha T^{\frac{2}{3-q}}\right)\right)^{\frac{1}{2}}.$$

41. The medium of claim 34, wherein the derivative is a call option giving the right to buy the underlying financial instrument at a strike price K at expiration time T, and the code includes code for programming the processor to determine the price f to be $$f=S(0)M_q(d_1,d_2,b(\Omega_N))-e^{-rT}KN_q(d_1,d_2)$$

where $$N_q(d_1, d_2) = \frac{1}{Z_N} \int_{d_1}^{d_2} (1-(1-q)\beta_N\Omega_N^2)^{\frac{1}{1-q}} d\Omega_N,$$

$$M_q(d_1, d_2, b(\Omega_N)) = \frac{1}{Z_N} \int_{d_1}^{d_2} \exp(b(\Omega_N))(1-(1-q)\beta_N\Omega_N^2)^{\frac{1}{1-q}} d\Omega_N,$$

$$b(\Omega_N) = \sigma\sqrt{\frac{\beta_N}{\beta(T)}}\Omega_N - \frac{\sigma^2}{2}\alpha T^{\frac{2}{3-q}}(1-(1-q)\beta_N\Omega_N^2),$$

$$\Omega_N = \Omega(T)\sqrt{\frac{\beta(T)}{\beta_N}},$$

$$\alpha = \frac{1}{2}(3-q)((2-q)(3-q)c)^{\frac{q-1}{3-q}},$$

$$Z_N = \int_{-\infty}^{\infty} (1-(1-q)\beta_N\Omega_N^2)^{\frac{1}{1-q}} d\Omega_N,$$

$$d_{1,2} = \frac{s_{1,2}}{\sigma\sqrt{\beta_N/\beta(T)}},$$

and $$s_{1,2} = \frac{-1}{\alpha T^{\frac{2}{3-q}}(1-q)\sigma\beta(T)} \pm \left(\frac{1}{\alpha T^{\frac{4}{3-q}}(1-q)^2\sigma^2\beta(T)^2} - \frac{2}{(1-q)\alpha T^{\frac{2}{3-q}}\sigma^2\beta(T)}\left(rT + \ln\frac{S(0)}{K} - \frac{\sigma^2}{2}\alpha T^{\frac{2}{3-q}}\right)\right)^{\frac{1}{2}},$$

where r is a risk-free rate of return.

42. The medium of claim 33, wherein the code includes code for programming the processor to identify, as the price f, a solution of $$\frac{df}{dt} + rS\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

43. The medium of claim 33, wherein the underlying financial instrument is a dividend paying instrument having dividend rate w, and the code includes code for programming the processor to identify, as the price f, a solution of $$\frac{df}{dt} + (r-w)S\frac{df}{dS} + \frac{1}{2}\frac{d^2f}{dS^2}\sigma^2 S^2 P_q^{1-q} = rf,$$

under boundary conditions specific to the derivative, where r is a risk-free rate of return.

44. The medium of claim 33, wherein the derivative is based on a futures contract F of the underlying financial instrument, r is a risk-free rate of return, the futures contract can be modeled as a financial instrument that pays dividends at a rate w equal to the risk-free rate of return r, and the code includes code for programming the processor to identify, as the price f, a solution of $$\frac{df}{dt} + \frac{1}{2}\frac{d^2f}{dF^2}\sigma^2 F^2 P_q^{1-q} = rf,$$

under boundary conditions specific to the derivative.

45. A computer readable medium which is a tangible object and which stores code for programming a processor to generate data indicative of the price, f(S), of a derivative having an underlying financial instrument whose price is $S=S(t+\tau)=S(\tau)e^{Y(t)}$, where t denotes a time delay, time interval, or timescale, $\tau$ is an initial time value, $\tau=0$ without loss of generality, Y(t) is a value that evolves across timescale t, and the underlying financial instrument has a return, including by determining the price S at time t=T to be $$S(T) = S(0)\exp\left(\Omega(T) + rT - \frac{\sigma^2}{2}\alpha T^{\frac{2}{3-q}}(1-(1-q)\beta(T)\Omega^2(T))\right),$$

where $$\alpha = \frac{1}{2}(3-q)((2-q)(3-q)c)^{\frac{q-1}{3-q}},$$

q is an entropic index, q>1, $\Omega$ is drive noise, $\sigma^2$ is a variance parameter of the logarithmic return of the underlying financial instrument, $$\beta(t) = c^{\frac{1-q}{3-q}}((2-q)(3-q)t)^{-2/(3-q)},$$

and $c=\beta N^2$ with $$N = \int_{-\infty}^{\infty} (1-(1-q)\beta\Omega^2)^{\frac{1}{1-q}} d\Omega$$

for any value of β, the drive noise Ω follows a statistical feedback process $$d\Omega = P_q(\Omega)^{(1-q)/2} d\omega$$

where ω is zero-mean Gaussian noise, $P_q(\Omega) \equiv P_q(\Omega,t|\Omega',t_0)$, $t_0=0$ without loss of generality, and $P_q$ is a conditional probability that evolves according to $$P_q(\Omega, t | 0, 0) = \frac{1}{Z(t)}(1-\beta(t)(1-q)(\Omega)^2)^{\frac{1}{1-q}}, \; Z(t) = ((2-q)(3-q)ct)^{\frac{1}{3-q}},$$

and determining the price, f, from said price S at time t=T.

46. A computer readable medium which is a tangible object and which stores code for programming a processor to generate data indicative of the price, f(S), of a derivative having an underlying financial instrument whose price is $S=S(t+\tau)=S(\tau)e^{Y(t)}$, where t denotes a time delay, time interval, or timescale, τ is an initial time value, τ=0 without loss of generality, Y(t) is a value that evolves across timescale t, and the underlying financial instrument has a return, including by determining the price S at time t=T to be $$S(T) = S(0)\exp\left(\int_0^T \sigma P_q^{\frac{1-q}{2}} dz_s + \int_0^T \left(r - \frac{\sigma^2}{2} P_q^{1-q}\right) ds\right),$$

where
q is an entropic index, q>1, z is drive noise, r is a risk-free rate of return, and $\sigma^2$ is a variance parameter of the logarithmic return of the underlying financial instrument, $P_q$ is a conditional probability that satisfies $$d\frac{\left(\ln S - rt + \frac{\sigma^2}{2} P_q^{1-q}(\Omega)\right)}{\sigma} = d\Omega,$$

Ω is drive noise, and the drive noise z satisfies $$dz = \left(\frac{\mu - r + \frac{\sigma^2 P_q^{1-q}}{2}}{\sigma P_q^{\frac{1-q}{2}}}\right) dt + d\omega,$$

where ω is zero-mean Gaussian noise,
and μ is the mean rate of return, and determining the price, f, from said price S at time t=T.

\* \* \* \* \*